United States Patent
Thornton et al.

(10) Patent No.: US 11,546,205 B1
(45) Date of Patent: Jan. 3, 2023

(54) CONTROL SYSTEM ANOMALY DETECTION USING NEURAL NETWORK CONSENSUS

(71) Applicant: Ironwood Cyber Inc., Dallas, TX (US)

(72) Inventors: Mitchell Thornton, Dallas, TX (US); Eric Larson, Dallas, TX (US); Theodore Manikas, Dallas, TX (US); Michael Taylor, Dallas, TX (US); Aviraj Sinha, Dallas, TX (US); Nathan Srirama, Dallas, TX (US)

(73) Assignee: Ironwood Cyber Inc., Dallas, TX (US)

( * ) Notice: Subject to any disclaimer, the term of this patent is extended or adjusted under 35 U.S.C. 154(b) by 0 days.

(21) Appl. No.: 17/837,472

(22) Filed: Jun. 10, 2022

Related U.S. Application Data

(60) Provisional application No. 63/275,759, filed on Nov. 4, 2021, provisional application No. 63/211,281, filed on Jun. 16, 2021.

(51) Int. Cl.
*H04L 41/0604* (2022.01)
*H04L 41/16* (2022.01)

(52) U.S. Cl.
CPC .......... *H04L 41/0622* (2013.01); *H04L 41/16* (2013.01)

(58) Field of Classification Search
None
See application file for complete search history.

(56) References Cited

U.S. PATENT DOCUMENTS

| | | | |
|---|---|---|---|
| 10,902,539 B2 * | 1/2021 | Rodriguez | G06K 9/6256 |
| 2018/0157552 A1 * | 6/2018 | Kaur | G05B 23/0221 |
| 2018/0367553 A1 | 12/2018 | Hayden et al. | |
| 2019/0138423 A1 * | 5/2019 | Agerstam | H04W 12/009 |
| 2019/0166141 A1 * | 5/2019 | Xu | G06N 3/0454 |
| 2019/0239101 A1 | 8/2019 | Ouyang et al. | |
| 2019/0303567 A1 | 10/2019 | Batmaz et al. | |
| 2019/0385057 A1 | 12/2019 | Litichever et al. | |
| 2020/0209842 A1 * | 7/2020 | Koizumi | G05B 23/0254 |
| 2021/0124913 A1 * | 4/2021 | Anderson | G06V 40/20 |
| 2021/0342652 A1 * | 11/2021 | Glassman | G06V 10/771 |
| 2021/0365762 A1 * | 11/2021 | Rafey | G06K 9/6256 |
| 2022/0019863 A1 * | 1/2022 | Iskandar | G06K 9/6284 |

FOREIGN PATENT DOCUMENTS

| | | | | |
|---|---|---|---|---|
| CN | 113298265 A | * | 8/2021 | |
| CN | 113376657 A | * | 9/2021 | G01S 13/865 |
| JP | 2021089723 A | * | 6/2021 | B60W 60/0011 |

OTHER PUBLICATIONS

Adel R. Alharbi, Demographic Group Prediction Based On Smart Device User Recognition Gestures, A Dissertation Presented to the Graduate Faculty of the Lyle School of Engineering Southern Methodist University in Partial Fulfillment of the Requirements for the degree of Doctor of Philosophy with a Major in Computer Engineering, May 2017.
International Search Report and Written Opinion issued in PCT/US22/32934 dated Aug. 24, 2022.

* cited by examiner

*Primary Examiner* — Kenny S Lin
(74) *Attorney, Agent, or Firm* — Wilson Sonsini Goodrich & Rosati

(57) ABSTRACT

Described herein are methods, systems, and platforms comprising neural networks for control system anomaly detection.

30 Claims, 17 Drawing Sheets

CONTROL SYSTEM ANOMALY DETECTION USING NEURAL NETWORK CONSENSUS

CROSS-REFERENCE TO RELATED APPLICATIONS

This application claims priority to U.S. Provisional Application No. 63/211,281, filed Jun. 16, 2021, and U.S. Provisional Application No. 63/275,759, filed Nov. 4, 2021, which are hereby incorporated by reference in their entireties.

BACKGROUND

Control systems provide transportation, essential utilities, and manufacturing of goods to the masses. It is critical that controlled processes within these systems are executed correctly and according to schedule. Monitoring the system's performance during their operation is important for maintaining their reliability and availability.

SUMMARY

Many control systems, including those in industrial and manufacturing facilities, rely on computer controlled electro-mechanical frameworks (e.g., industrial control system (ICS)). These frameworks coordinate industrial operations between protocols, connections, and devices in the control system, so they can be executed properly and on schedule. Further, these various components are generally interoperable due to the emergence of standardized computer interfaces and networking protocols that support control system implementations. Thus, it may be the case that the control system demonstrates state-like behavior that characterizes its overall functionality. However, often times the protocols employed may be open communication protocols or the software may be open source, which may increase the risk of cyberattacks. Further, the components in the control system may be supplied by various vendors and often have large state spaces with high complexity (e.g., cycling states), thus making it impractical to capture the complete behavior of the control system. Thus, critical processes may be disrupted, resulting in damage to essential utilities, without detection.

Detecting anomalies in a control system may help to increase its safety, reliability, and resilience. An automated anomaly detection may be achieved using machine learning/artificial intelligence (ML) algorithms, such as neural networks, that analyze the overall health of the components in a control system and predict the states of the components. The ML algorithms may consider patterns in data related to network traffic as well data from equipment (e.g., sensor data), and the states may be classified taking into account random deviations that may occur. If the control system is functioning properly, the state classified should match or be reasonably similar (i.e., consensus from the two models is achieved). However, when faulty equipment or processing errors cause unexpected behavior in the system, the classification may diverge, causing loss of consensus. Because the system diverges from normal behavior, this classification can also be described as anomaly detection.

In one aspect, disclosed herein are computer-implemented methods for control system anomaly detection comprising: receiving input data comprising: sensor data from equipment in the control system; and network data from a network in communication with the control system; normalizing distributions of the sensor data and the network data; checking time alignment between the sensor data to the network data; selecting a time window for accumulating the sensor data and the network data; feeding the sensor data into a first neural network comprising a behavior classifier of the equipment of the control system to output a first classified state of the control system; feeding the network data into a second neural network comprising a network traffic classifier to output a second classified state of the control system; and comparing the first and the second classified states for consensus for system anomaly detection, wherein accumulation of differences in classified states in a given time interval above a threshold indicates occurrence of an anomaly. In some embodiments, the control system comprises an industrial control system, distributed control system (DCS), supervisory control and data acquisition (SCADA) system, embedded control system, or a combination thereof. In some embodiments, the control system comprises a general purpose computer. In some embodiments, the industrial control system comprises one or more of programmable logic controllers, remote terminal units, intelligent electronic devices, engineering workstations, human machine interfaces, data historians, communication gateways, and front-end processors. In some embodiments, the control system employs one or more network communication protocols. In further embodiments, the one or more network communication protocols comprise standard network communication protocols, non-standard network communication protocols, or a combination thereof. In still further embodiments, the standard network communication protocols comprise process field bus (Profibus), process field net (Profinet), highway addressable remote transducer (HART), distributed network protocol (DNP3), Modbus, open platform communication (OPC), building automation and control networks (BACnet), common industrial protocol (CIP), or ethernet for control automation technology (EtherCAT). In some embodiments, the sensor data comprises time series data. In some embodiments, the sensor data is obtained from a standalone sensor or an integrated sensor. In further embodiments, the integrated sensor is part of a control device comprising an actuator. In some embodiments, the network data comprises packet data, metadata, or a combination thereof. In further embodiments, the packet data comprises a packet's header, payload, trailer, or any combination thereof. In still further embodiments, the packet data from the packet's payload comprises bit streams. In some embodiments, normalizing distributions of the sensor data and the network data comprises adjusting the distributions' mean, variance, higher-ordered moments, or a combination thereof. In some embodiments, the method comprises resampling the sensor data, the network data, or a combination thereof for the time alignment between the sensor data and network data. In further embodiments, the resampling results in the sensor data and the network data having a same number of samples. In further embodiments, the resampling comprises downsampling. In further embodiments, the resampling comprises upsampling. In further embodiments, the resampling comprises unsampling. In some embodiments, the method comprises windowing to adjust the time window for accumulating the sensor data, the network data, or a combination thereof. In further embodiments, the windowing accounts for delays in the network data, the sensor data, or a combination thereof. In some embodiments, one or both of the first neural network and the second neural network are deep neural networks. In further embodiments, the deep neural networks comprise convolutional layers such that one or both of the first neural network and the second neural network are convolutional neural networks. In still further embodiments, the convolutional neural networks comprise convolutional layers, pooling layers, flattening layers, dropout layers, and dense layers. In still further embodiments, the convolutional layers comprise 1D, 2D, or 3D convolutional layers. In still further embodiments, the pooling layers comprise maximum pooling layers, minimum pooling layers, average pooling layers, or a combination thereof. In still further embodiments, the convolutional neural networks have hyperparameters that are empirically chosen based on patterns in the network of the control system. In still further embodiments, the convolutional neural networks are supervised for training to identify one or both of the first classified state and the second classified state. In some embodiments, the comparing the first and the second classified states for consensus for system anomaly detection is unsupervised for detecting the differences between the first and the second classified states. In some embodiments, the threshold is an average discrepancy rate between the first and the second classified state. In further embodiments, the threshold is dynamically changed over time. In some embodiments, the anomaly is due to attacks on at least one of the equipment in the control system and the network of the control system.

In another aspect, disclosed herein are computer-implemented systems for control system anomaly detection comprising: at least one logic element configured to perform operations on sensor data from equipment in the control system and network data from a network in the control system the operations comprising: a normalization operation to normalize distributions of the sensor data and the network data; a checking operation to check time alignment between the sensor data and the network data; and a selection operation to select a time window for accumulating the sensor data and the network data; a first neural network comprising a behavior classifier of the equipment of the control system for outputting a first classified state of the control system from the sensor data; a second neural network comprising a network traffic classifier for outputting a second classified state of the control system from the network data; and a discrepancy aggregator for comparing the first and the second classified state for consensus for control system anomaly detection, wherein accumulation of differences in the classified states in a given time interval above a threshold indicates occurrence of an anomaly. In some embodiments, the computer-implemented system comprises at least one processor, a memory, and instructions executable by at least one processor. In some embodiments, the computer-implemented system comprises a general purpose computer. In some embodiments, the at least one logic element comprises a programmable logic controller (PLC), programmable logic array (PLA), programmable array logic (PAL), generic logic array (GLA), complex programmable logic decide (CPLD), field programmable gate array (FPGA), or application-specific integrated circuit (ASIC). In some embodiments, the at least one logic element is implemented on a general purpose computer. In some embodiments, the control system comprises an industrial control system, distributed control system (DCS), supervisory control and data acquisition (SCADA) system, embedded system, or a combination thereof. In further embodiments, the industrial control system comprises one or more of programmable logic controllers, remote terminal units, intelligent electronic devices, engineering workstations, human machine interfaces, data historians, communication gateways, and front-end processors. In some embodiments, the control system employs one or more network communication protocols. In further embodiments, the one or more network communication protocols comprise standard network communication protocols, non-standard network communication protocols, or a combination thereof. In still further embodiments, the standard network communication protocols comprise process field bus (Profibus), process field net (Profinet), highway addressable remote transducer (HART), distributed network protocol (DNP3), Modbus, open platform communication (OPC), building automation and control networks (BACnet), common industrial protocol (CIP), or ethernet for control automation technology (EtherCAT). In some embodiments, the sensor data comprises time series data. In some embodiments, the sensor data is obtained from a standalone sensor or an integrated sensor. In further embodiments, the integrated sensor is part of a control device comprising an actuator. In some embodiments, the network data comprises packet data, metadata, or a combination thereof. In further embodiments, the packet data comprises a packet's header, payload, trailer, or a combination thereof. In still further embodiments, the packet data from the packet's payload comprises bit streams. In some embodiments, the normalization operation comprises adjusting the distribution's mean, variance, higher-ordered moments, or a combination thereof. In some embodiments, the at least one logic element is configured to perform a resampling operation of the sensor data, the network data, or a combination thereof for the time alignment between the network data and the sensor data. In further embodiments, the resampling operation results in the sensor data and the network data having a same number of samples. In further embodiments, the resampling operation comprises downsampling. In further embodiments, the resampling operation comprises upsampling. In further embodiments, the resampling operation comprises unsampling. In some embodiments, the at least one logic element is configured to perform a windowing operation to adjust the time windows for accumulating the sensor data, the network data, or a combination thereof. In further embodiments, the windowing operation accounts for delays in the network data, sensors data, or a combination thereof. In some embodiments, one or both of the first neural network and the second neural network are deep neural networks. In further embodiments, the deep neural networks comprise convolutional layers such that one or both of the first neural network and the second neural network are convolutional neural networks. In still further embodiments, the convolutional neural networks comprise convolutional layers, pooling layers, flattening layers, dropout layers, and dense layers. In still further embodiments, the convolutional layers comprise 1D, 2D, or 3D convolutional layers. In still further embodiments, the pooling layers comprise maximum pooling layers, minimum pooling layers, average pooling layers, or a combination thereof. In further embodiments, the convolutional neural networks have hyperparameters that are empirically chosen based on patterns in the network of the control system. In further embodiments, the convolutional neural networks are supervised for training to identify the classified states. In some embodiments, the threshold is an average discrepancy rate between the first and the second classified state. In further embodiments, the threshold is dynamically changed over time. In some embodiments, the anomaly is due to attacks on at least one of the equipment in the control system and the network of the control system.

In another aspect, disclosed herein are platforms for control system anomaly detection comprising: an apparatus comprising at least one logic element for performing operations on sensor data from equipment in the control system and network data from a network in communication with the control system; and a discrepancy aggregator for control system anomaly detection; and a cloud computing resource communicably coupled to the apparatus and comprising a first neural network and a second neural network; wherein the operations comprise: a normalization operation to normalize distributions of the sensor data and the network data; a checking operation to check time alignment between the sensor data and the network data; and a selection operation to select a time window for accumulating the sensor data and the network data; wherein the first neural network comprises a behavior classifier of the equipment of the control system outputting a first classified state of the control system from the sensor data from the operations; wherein the second neural network comprises a network traffic classifier outputting a second classified state of the control system from the network data from the operations; wherein the discrepancy aggregator compares the first and the second classified state for consensus for control system anomaly detection; and wherein accumulation of differences in the classified states in a given time interval above a threshold indicates occurrence of an anomaly. In some embodiments, the apparatus comprising at least one logic element comprises at least one processor, a memory, and instructions executable by at least one processor. In some embodiments, the at least one logic element comprises a programmable logic controller (PLC), programmable logic array (PLA), programmable array logic (PAL), generic logic array (GLA), complex programmable logic decide (CPLD), field programmable gate array (FPGA), or application-specific integrated circuit (ASIC). In some embodiments, the control system comprises an industrial control system, distributed control system (DCS), supervisory control and data acquisition (SCADA) system, embedded system, or a combination thereof. In some embodiments, the industrial control system comprises one or more of programmable logic controllers, remote terminal units, intelligent electronic devices, engineering workstations, human machine interfaces, data historians, communication gateways, and front-end processors. In some embodiments, the control system employs one or more network communication protocols. In further embodiments, the one or more network communication protocols comprise standard network communication protocols, non-standard network communication protocols, or a combination thereof. In still further embodiments, the standard network communication protocols comprise process field bus (Profibus), process field net (Profinet), highway addressable remote transducer (HART), distributed network protocol (DNP3), Modbus, open platform communication (OPC), building automation and control networks (BACnet), common industrial protocol (CIP), or ethernet for control automation technology (EtherCAT). In some embodiments, the sensor data comprises time series data. In some embodiments, the sensor data is obtained from a standalone sensor or an integrated sensor. In further embodiments, the integrated sensor is part of a control device comprising an actuator. In some embodiments, the network data comprises packet data, metadata, or a combination thereof. In further embodiments, the packet data comprises a packet's header, payload, trailer, or a combination thereof. In still further embodiments, the packet data from the packet's payload comprises bit streams. In some embodiments, the normalization operation comprises adjusting the distribution's mean, variance, higher-ordered moments, or a combination thereof. In some embodiments, the operations comprise a resampling operation of the sensor data, the network data, or a combination thereof for the time alignment between the network data and the sensor data. In further embodiments, the resampling operation results in the sensor data and the network data having a same number of samples. In further embodiments, the resampling operation comprises downsampling. In further embodiments, the resampling operation comprises upsampling. In further embodiments, the resampling operation comprises unsampling. In some embodiments, the operations comprise a windowing operation to adjust the time windows for accumulating the sensor data, the network data, or a combination thereof. In further embodiments, the windowing operation accounts for delays in the network data, sensors data, or a combination thereof. In some embodiments, one or both of the first neural network and the second neural network are deep neural networks. In further embodiments, the deep neural networks comprise convolutional layers such that one or both of the first neural network and the second neural network are convolutional neural networks. In still further embodiments, the convolutional neural networks comprise convolutional layers, pooling layers, flattening layers, dropout layers, and dense layers. In still further embodiments, the convolutional layers comprise 1D, 2D, or 3D convolutional layers. In still further embodiments, the pooling layers comprise maximum pooling layers, minimum pooling layers, average pooling layers, or a combination thereof. In still further embodiments, the convolutional neural networks have hyperparameters that are empirically chosen based on patterns in the network of the control system. In still further embodiments, the convolutional neural network is supervised for training to identify the first and the second classified states. In some embodiments, the threshold is an average discrepancy rate between the first and the second classified state. In further embodiments, the threshold is dynamically changed over time. In some embodiments, the anomaly is due to attacks on at least one of the equipment in the control system and the network of the control system.

In another aspect, disclosed herein are computer-implemented methods of training neural networks for control system anomaly detection comprising: collecting input data comprising sensor data from equipment in the control system and network data from a network in communication with the control system; preprocessing the sensor data and the network data to output preprocessed sensor data and preprocessed network data, the preprocessing comprising: normalizing to adjust distributions of the sensor data and the network data; checking the sensor data and the network data for time alignment; and selecting a time window for accumulating the sensor data and the network data; creating training sets comprising a first training set comprising the preprocessed sensor data and a second training set comprising the preprocessed network data; and training a first neural network comprising a behavior classifier of the equipment of the control system with the first training set to output a first classified state; and training a second neural network comprising a network traffic classifier with the second training set to output a second classified state. In various embodiments, the method is implemented on a general purpose computer, a server, a cluster of servers, a distributed computing platform, or a cloud computing platform. In some embodiments, the network data comprises packet data, metadata, or a combination thereof. In further embodiments, the packet data comprises a packet's header, payload, trailer, or a combination thereof. In still further embodiments, the packet data from the packet's payload comprises bit streams. In some embodiments, normalizing comprises adjusting the distribution's mean, variance, higher-ordered moments, or a combination thereof. In some embodiments, the preprocessing comprises resampling for the time alignment of the sensor data, the network data, or a combination thereof. In further embodiments, the resampling results in the sensor data and the network data having a same number of samples. In further embodiments, resampling comprises downsampling, upsampling, or unsampling. In some embodiments, the preprocessing comprises windowing to adjust the time windows for accumulating the sensor data, the network data, or a combination thereof. In further embodiments, the windowing accounts for delays in the network data, the sensor data, or a combination thereof. In some embodiments, one or both of the first neural network and the second neural network are deep neural networks. In further embodiments, the deep neural networks comprise convolutional layers such that one or both of the first neural network and the second neural network are convolutional neural networks. In still further embodiments, the convolutional neural networks comprise convolutional layers, pooling layers, flattening layers, dropout layers, and dense layers. In still further embodiments, the convolutional layers comprise 1D, 2D, or 3D. In still further embodiments, the pooling layers comprise maximum pooling layers, minimum pooling layers, average pooling layers, or a combination thereof. In still further embodiments, the convolutional neural networks have hyperparameters empirically chosen based on patterns in the network of the control system.

BRIEF DESCRIPTION OF THE DRAWINGS

A better understanding of the features and advantages of the present subject matter will be obtained by reference to the following detailed description that sets forth illustrative embodiments and the accompanying drawings of which.

DETAILED DESCRIPTION

Figure 1:
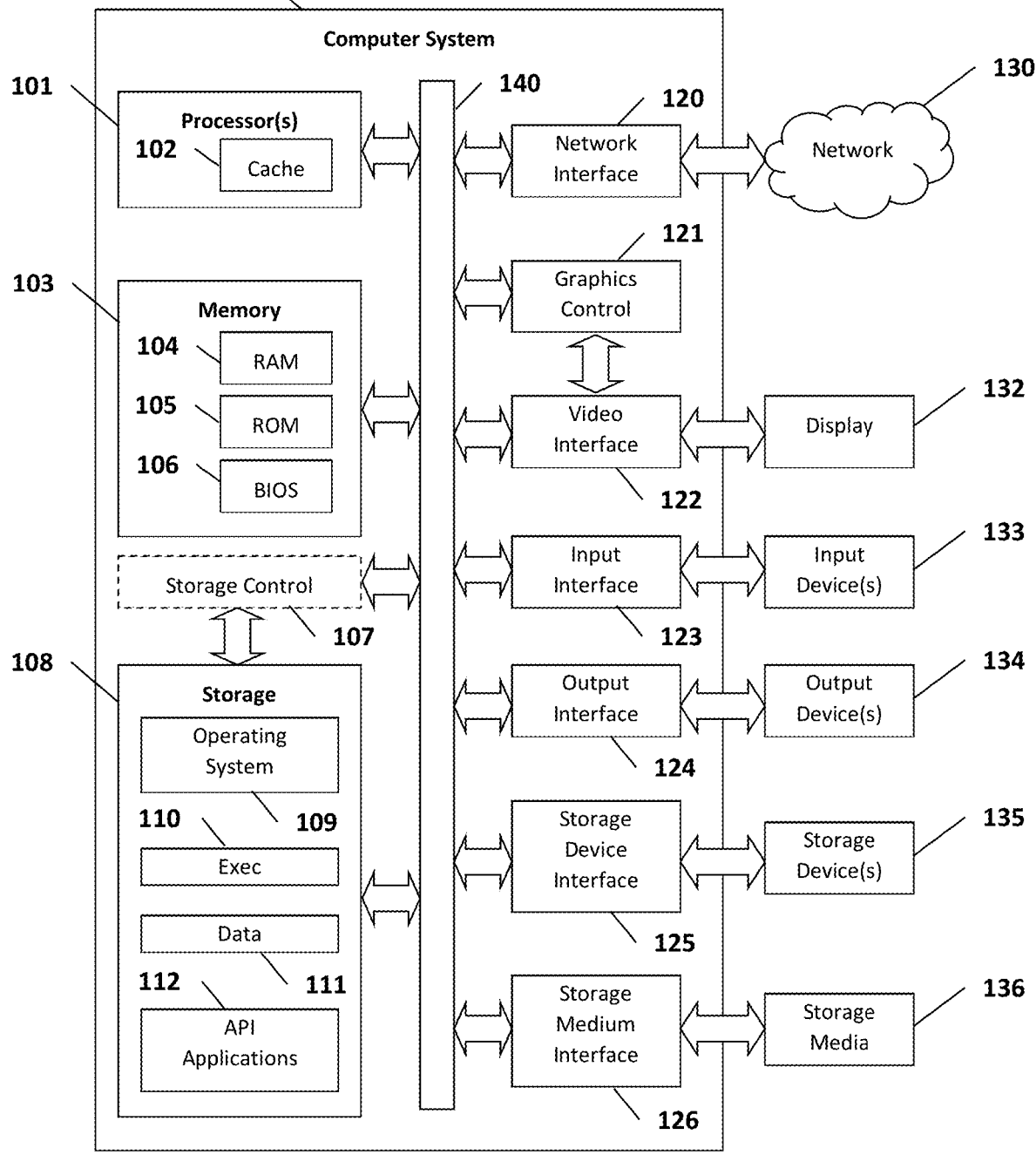
FIG. 1 shows a non-limiting example of a computing device; in this case, a device with one or more processors, memory, storage, and a network interface.
Figure 2:
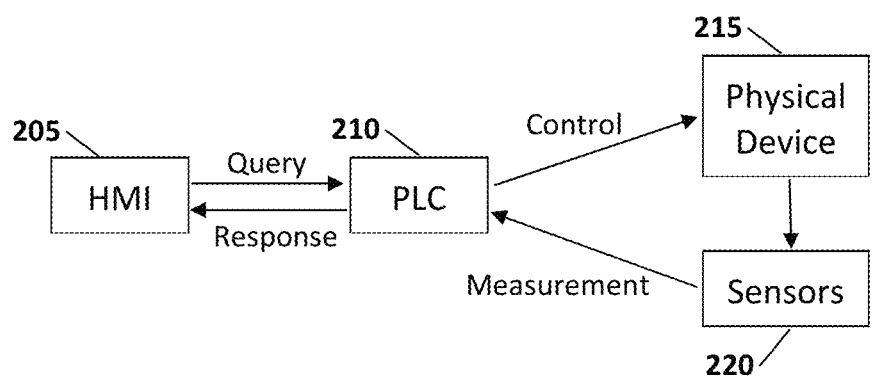
FIG. 2 shows a non-limiting example of a block diagram of a generic ICS feedback loop.

Described herein, in certain embodiments, are computer-implemented methods for control system anomaly detection comprising: receiving input data comprising: sensor data from equipment in the control system; and network data from a network in communication with the control system; normalizing distributions of the sensor data and the network data; checking time alignment between the sensor data to the network data; selecting a time window for accumulating the sensor data and the network data; feeding the sensor data into a first neural network comprising a behavior classifier of the equipment of the control system to output a first classified state of the control system; feeding the network data into a second neural network comprising a network traffic classifier to output a second classified state of the control system; and comparing the first and the second classified states for consensus for system anomaly detection, wherein accumulation of differences in classified states in a given time interval above a threshold indicates occurrence of an anomaly.

Also described herein, in certain embodiments, are computer-implemented systems for control system anomaly detection comprising: at least one logic element configured to perform operations on sensor data from equipment in the control system and network data from a network in the control system the operations comprising: a normalization operation to normalize distributions of the sensor data and the network data; a checking operation to check time alignment between the sensor data and the network data; and a selection operation to select a time window for accumulating the sensor data and the network data; a first neural network comprising a behavior classifier of the equipment of the control system for outputting a first classified state of the control system from the sensor data; a second neural network comprising a network traffic classifier for outputting a second classified state of the control system from the network data; and a discrepancy aggregator for comparing the first and the second classified state for consensus for control system anomaly detection, wherein accumulation of differences in the classified states in a given time interval above a threshold indicates occurrence of an anomaly.

Also described herein, in certain embodiments, are platforms for control system anomaly detection comprising: an apparatus comprising at least one logic element for performing operations on sensor data from equipment in the control system and network data from a network in communication with the control system; and a discrepancy aggregator for control system anomaly detection; and a cloud computing resource communicably coupled to the apparatus and comprising a first neural network and a second neural network; wherein the operations comprise: a normalization operation to normalize distributions of the sensor data and the network data; a checking operation to check time alignment between the sensor data and the network data; and a selection operation to select a time window for accumulating the sensor data and the network data; wherein the first neural network comprises a behavior classifier of the equipment of the control system outputting a first classified state of the control system from the sensor data from the operations; wherein the second neural network comprises a network traffic classifier outputting a second classified state of the control system from the network data from the operations; wherein the discrepancy aggregator compares the first and the second classified state for consensus for control system anomaly detection; and wherein accumulation of differences in the classified states in a given time interval above a threshold indicates occurrence of an anomaly.

Also described herein, in certain embodiments, are computer-implemented methods of training neural networks for control system anomaly detection comprising: collecting input data comprising sensor data from equipment in the control system and network data from a network in communication with the control system; preprocessing the sensor data and the network data to output preprocessed sensor data and preprocessed network data, the preprocessing comprising: normalizing to adjust distributions of the sensor data and the network data; checking the sensor data and the network data for time alignment; and selecting a time window for accumulating the sensor data and the network data; creating training sets comprising a first training set comprising the preprocessed sensor data and a second training set comprising the preprocessed network data; and training a first neural network comprising a behavior classifier of the equipment of the control system with the first training set to output a first classified state; and training a second neural network comprising a network traffic classifier with the second training set to output a second classified state.

Certain Definitions

Unless otherwise defined, all technical terms used herein have the same meaning as commonly understood by one of ordinary skill in the art to which the present subject matter belongs.

As used in this specification and the appended claims, the singular forms "a," "an," and "the" include plural references unless the context clearly dictates otherwise. Any reference to "or" herein is intended to encompass "and/or" unless otherwise stated.

Reference throughout this specification to "some embodiments," "further embodiments," or "a particular embodiment," means that a particular feature, structure, or characteristic described in connection with the embodiment is included in at least one embodiment. Thus, the appearances of the phrase "in some embodiments," or "in further embodiments," or "in a particular embodiment" in various places throughout this specification are not necessarily all referring to the same embodiment. Furthermore, the particular features, structures, or characteristics may be combined in any suitable manner in one or more embodiments.

As used herein, the term "control system" may generally refer to a framework to coordinate operations between components, such as protocols, connections, and devices, in a system. In some embodiments, the operations may be executed with one or more logic elements. In various embodiments, the control system comprises an industrial control system (ICS), distributed control system (DCS), supervisory control and data acquisition (SCADA) system, embedded system, or a combination thereof. In some embodiments, the control system comprises a general purpose computing system with one or more network connections such as the Internet, Bluetooth, and the like, wherein the general purpose computing system is controlled by user input or by application programs running on the general purpose computing system. In further embodiments, the general purpose computing system comprises an edge device such as a desktop or a notebook, tablet, smartphone, or other portable computing device. In further embodiments, the general purpose computing system comprises a server or server cluster interconnected to a combination of local components and remote components via one or more network connections.

As used herein, the term "neural network" may generally refer to a computational network composed of nodes. The nodes of the neural network may be connected as layers or graphs. In some embodiments, the neural network comprises an algorithm designed for solving a specific problem. In some embodiments, the neural network may comprise a generalizable algorithm to solve a range of problems. In some embodiments, the neural network may "learn" how to solve one or more problems.

As used herein, the term "classified state" or "classified states" may generally refer to a state(s) of a component(s) in a control system or in communication with a control system. The state may be determined based on values, ranges, or patterns detected in physical measurements of components in the control system or in communication with the control system. In some embodiments, the states may be determined by a ML algorithm for classification or clustering. In some cases, the ML algorithm may be a neural network.

As used herein, the term "discrepancy aggregator" may generally refer to a computational framework comprising at least one logic element for comparing classified states of components of a control system. In some embodiments, the discrepancy aggregator may accumulate errors (or difference) between classified states for a given time period if the classified states of the components in the control system lack consensus. In some embodiments, the accumulation of errors may be compared to a threshold. If the accumulation of errors is greater than the threshold, an anomaly may be identified in the control system.

As used herein, the term "anomaly" or "anomalies" may generally refer to abnormal behavior in one or more components in a control system or in communication with the control system. Abnormal behavior may comprise of irregular values, ranges, or patterns detected in physical measurements of components in the control system or in communication with the control system. In some embodiments, the anomaly may comprise of faulty components due to wearing of components over time or due to an accident. In some embodiments, the anomaly may be indicative of a cyberattack.

Computing System

Referring to FIG. 1, a block diagram is shown depicting an exemplary machine that includes a computer system 100 (e.g., a processing or computing system) within which a set of instructions can execute for causing a device to perform or execute any one or more of the aspects and/or methodologies for static code scheduling of the present disclosure. The components in FIG. 1 are examples only and do not limit the scope of use or functionality of any hardware, software, embedded logic component, or a combination of two or more such components implementing particular embodiments.

Computer system 100 may include one or more processors 101, a memory 103, and a storage 108 that communicate with each other, and with other components, via a bus 140. The bus 140 may also link a display 132, one or more input devices 133 (which may, for example, include a keypad, a keyboard, a mouse, a stylus, etc.), one or more output devices 134, one or more storage devices 135, and various tangible storage media 136. All of these elements may interface directly or via one or more interfaces or adaptors to the bus 140. For instance, the various tangible storage media 136 can interface with the bus 140 via storage medium interface 126. Computer system 100 may have any suitable physical form, including but not limited to one or more integrated circuits (ICs), printed circuit boards (PCBs), mobile handheld devices (such as mobile telephones or PDAs), laptop or notebook computers, distributed computer systems, computing grids, or servers.

Computer system 100 includes one or more processor(s) 101 (e.g., central processing units (CPUs), general purpose graphics processing units (GPGPUs), or quantum processing units (QPUs)) that carry out functions. Processor(s) 101 optionally contains a cache memory unit 102 for temporary local storage of instructions, data, or computer addresses. Processor(s) 101 are configured to assist in execution of computer readable instructions. Computer system 100 may provide functionality for the components depicted in FIG. 1 as a result of the processor(s) 101 executing non-transitory, processor-executable instructions embodied in one or more tangible computer-readable storage media, such as memory 103, storage 108, storage devices 135, and/or storage medium 136. The computer-readable media may store software that implements particular embodiments, and processor(s) 101 may execute the software. Memory 103 may read the software from one or more other computer-readable media (such as mass storage device(s) 135, 136) or from one or more other sources through a suitable interface, such as network interface 120. The software may cause processor(s) 101 to carry out one or more processes or one or more steps of one or more processes described or illustrated herein. Carrying out such processes or steps may include defining data structures stored in memory 103 and modifying the data structures as directed by the software.

The memory 103 may include various components (e.g., machine readable media) including, but not limited to, a random access memory component (e.g., RAM 104) (e.g., static RAM (SRAM), dynamic RAM (DRAM), ferroelectric random access memory (FRAM), phase-change random access memory (PRAM), etc.), a read-only memory component (e.g., ROM 105), and any combinations thereof. ROM 105 may act to communicate data and instructions unidirectionally to processor(s) 101, and RAM 104 may act to communicate data and instructions bidirectionally with processor(s) 101. ROM 105 and RAM 104 may include any suitable tangible computer-readable media described below. In one example, a basic input/output system 106 (BIOS), including basic routines that help to transfer information between elements within computer system 100, such as during start-up, may be stored in the memory 103.

Fixed storage 108 is connected bidirectionally to processor(s) 101, optionally through storage control unit 107. Fixed storage 108 provides additional data storage capacity and may also include any suitable tangible computer-readable media described herein. Storage 108 may be used to store operating system 109, executable(s) 110, data 111, applications 112 (application programs), and the like. Storage 108 can also include an optical disk drive, a solid-state memory device (e.g., flash-based systems), or a combination of any of the above. Information in storage 108 may, in appropriate cases, be incorporated as virtual memory in memory 103.

In one example, storage device(s) 135 may be removably interfaced with computer system 100 (e.g., via an external port connector (not shown)) via a storage device interface 125. Particularly, storage device(s) 135 and an associated machine-readable medium may provide non-volatile and/or volatile storage of machine-readable instructions, data structures, program modules, and/or other data for the computer system 100. In one example, software may reside, completely or partially, within a machine-readable medium on storage device(s) 135. In another example, software may reside, completely or partially, within processor(s) 101.

Bus 140 connects a wide variety of subsystems. Herein, reference to a bus may encompass one or more digital signal lines serving a common function, where appropriate. Bus 140 may be any of several types of bus structures including, but not limited to, a memory bus, a memory controller, a peripheral bus, a local bus, and any combinations thereof, using any of a variety of bus architectures. As an example and not by way of limitation, such architectures include an Industry Standard Architecture (ISA) bus, an Enhanced ISA (EISA) bus, a Micro Channel Architecture (MCA) bus, a Video Electronics Standards Association local bus (VLB), a Peripheral Component Interconnect (PCI) bus, a PCI-Express (PCI-X) bus, an Accelerated Graphics Port (AGP) bus, HyperTransport (HTX) bus, serial advanced technology attachment (SATA) bus, and any combinations thereof.

Computer system 100 may also include an input device 133. In one example, a user of computer system 100 may enter commands and/or other information into computer system 100 via input device(s) 133. Examples of an input device(s) 133 include, but are not limited to, an alpha-numeric input device (e.g., a keyboard), a pointing device (e.g., a mouse or touchpad), a touchpad, a touch screen, a multi-touch screen, a joystick, a stylus, a gamepad, an audio input device (e.g., a microphone, a voice response system, etc.), an optical scanner, a video or still image capture device (e.g., a camera), and any combinations thereof. In some embodiments, the input device is a Kinect, Leap Motion, or the like. Input device(s) 133 may be interfaced to bus 140 via any of a variety of input interfaces 123 (e.g., input interface 123) including, but not limited to, serial, parallel, game port, USB, FIREWIRE, THUNDERBOLT, or any combination of the above.

In particular embodiments, when computer system 100 is connected to network 130, computer system 100 may communicate with other devices, specifically mobile devices and enterprise systems, distributed computing systems, cloud storage systems, cloud computing systems, and the like, connected to network 130. Communications to and from computer system 100 may be sent through network interface 120. For example, network interface 120 may receive incoming communications (such as requests or responses from other devices) in the form of one or more packets (such as Internet Protocol (IP) packets) from network 130, and computer system 100 may store the incoming communications in memory 103 for processing. Computer system 100 may similarly store outgoing communications (such as requests or responses to other devices) in the form of one or more packets in memory 103 and communicated to network 130 from network interface 120. Processor(s) 101 may access these communication packets stored in memory 103 for processing.

Examples of the network interface 120 include, but are not limited to, a network interface card, a modem, and any combination thereof. Examples of a network 130 or network segment 130 include, but are not limited to, a distributed computing system, a cloud computing system, a wide area network (WAN) (e.g., the Internet, an enterprise network), a local area network (LAN) (e.g., a network associated with an office, a building, a campus or other relatively small geographic space), a telephone network, a direct connection between two computing devices, a peer-to-peer network, and any combinations thereof. A network, such as network 130, may employ a wired and/or a wireless mode of communication. In general, any network topology may be used.

Information and data can be displayed through a display 132. Examples of a display 132 include, but are not limited to, a cathode ray tube (CRT), a liquid crystal display (LCD), a thin film transistor liquid crystal display (TFT-LCD), an organic liquid crystal display (OLED) such as a passive-matrix OLED (PMOLED) or active-matrix OLED (AMO-LED) display, a plasma display, and any combinations thereof. The display 132 can interface to the processor(s) 101, memory 103, and fixed storage 108, as well as other devices, such as input device(s) 133, via the bus 140. The display 132 is linked to the bus 140 via a video interface 122, and transport of data between the display 132 and the bus 140 can be controlled via the graphics control 121. In some embodiments, the display is a video projector.

In addition to a display 132, computer system 100 may include one or more other peripheral output devices 134 including, but not limited to, an audio speaker, a printer, a storage device, and any combinations thereof. Such peripheral output devices may be connected to the bus 140 via an output interface 124. Examples of an output interface 124 include, but are not limited to, a serial port, a parallel connection, a USB port, a FIREWIRE port, a THUNDERBOLT port, and any combinations thereof.

In addition or as an alternative, computer system 100 may provide functionality as a result of logic hardwired or otherwise embodied in a circuit, which may operate in place of or together with software to execute one or more processes or one or more steps of one or more processes described or illustrated herein. Reference to software in this disclosure may encompass logic, and reference to logic may encompass software. Moreover, reference to a computer-readable medium may encompass a circuit (such as an IC) storing software for execution, a circuit embodying logic for execution, or both, where appropriate. The present disclosure encompasses any suitable combination of hardware, software, or both.

Those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by one or more processor(s), or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In accordance with the description herein, suitable computing devices include, by way of non-limiting examples, server computers, desktop computers, laptop computers, notebook computers, sub-notebook computers, netbook computers, netpad computers, set-top computers, media streaming devices, handheld computers, Internet appliances, mobile smartphones, tablet computers, personal digital assistants, and vehicles. Those of skill in the art will also recognize that select televisions, video players, and digital music players with optional computer network connectivity are suitable for use in the system described herein. Suitable tablet computers, in various embodiments, include those with booklet, slate, and convertible configurations, known to those of skill in the art.

In some embodiments, the computing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smartphone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®. Those of skill in the art will also recognize that suitable media streaming device operating systems include, by way of non-limiting examples, Apple TV®, Roku, Boxee®, Google TV®, Google Chromecast®, Amazon Fire®, and Samsung® HomeSync®.

Non-Transitory Computer Readable Storage Medium

In some embodiments, the platforms, systems, media, and methods disclosed herein include one or more non-transitory computer readable storage media encoded with a program including instructions executable by the operating system of an optionally networked computing device. In further embodiments, a computer readable storage medium is a tangible component of a computing device. In still further embodiments, a computer readable storage medium is optionally removable from a computing device. In some embodiments, a computer readable storage medium includes, by way of non-limiting examples, CD-ROMs, DVDs, flash memory devices, solid state memory, magnetic disk drives, magnetic tape drives, optical disk drives, distributed computing systems including cloud computing systems and services, and the like. In some cases, the program and instructions are permanently, substantially permanently, semi-permanently, or non-transitorily encoded on the media.

Computer Program

In some embodiments, the platforms, systems, media, and methods disclosed herein include at least one computer program, or use of the same. A computer program includes a sequence of instructions, executable by one or more processor(s) of the computing device's CPU, written to perform a specified task. Computer readable instructions may be implemented as program modules, such as functions, objects, Application Programming Interfaces (APIs), computing data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Web Application

In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft® .NET or Ruby on Rails (RoR). In some embodiments, a web application utilizes one or more database systems including, by way of non-limiting examples, relational, non-relational, object oriented, associative, XML, and document oriented database systems. In further embodiments, suitable relational database systems include, by way of non-limiting examples, Microsoft® SQL Server, mySQL™, and Oracle®. Those of skill in the art will also recognize that a web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or eXtensible Markup Language (XML). In some embodiments, a web application is written to some extent in a presentation definition language such as Cascading Style Sheets (CSS). In some embodiments, a web application is written to some extent in a client-side scripting language such as Asynchronous JavaScript and XML (AJAX), Flash® ActionScript, JavaScript, or Silverlight®. In some embodiments, a web application is written to some extent in a server-side coding language such as Active Server Pages (ASP), ColdFusion, Perl, Java™, JavaServer Pages (JSP), Hypertext Preprocessor (PHP), Python™, Ruby, Tcl, Smalltalk, WebDNA®, or Groovy. In some embodiments, a web application is written to some extent in a database query language such as Structured Query Language (SQL). In some embodiments, a web application integrates enterprise server products such as IBM® Lotus Domino®. In some embodiments, a web application includes a media player element. In various further embodiments, a media player element utilizes one or more of many suitable multimedia technologies including, by way of non-limiting examples, Adobe® Flash®, HTML 5, Apple® QuickTime®, Microsoft® Silverlight®, Java™, and Unity®.

Mobile Application

In some embodiments, a computer program includes a mobile application provided to a mobile computing device. In some embodiments, the mobile application is provided to a mobile computing device at the time it is manufactured. In other embodiments, the mobile application is provided to a mobile computing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C#, Objective-C, Java™, JavaScript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and PhoneGap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Google® Play, Chrome WebStore, BlackBerry® App World, App Store for Palm devices, App Catalog for webOS, Windows® Marketplace for Mobile, Ovi Store for Nokia® devices, Samsung® Apps, and Nintendo® DSi Shop.

Standalone Application

In some embodiments, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB .NET, or combinations thereof. Compilation is often performed, at least in part, to create an executable program. In some embodiments, a computer program includes one or more executable complied applications.

Software Modules

In some embodiments, the platforms, systems, media, and methods disclosed herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, a distributed computing resource, a cloud computing resource, or combinations thereof. In further various embodiments, a software module comprises a plurality of files, a plurality of sections of code, a plurality of programming objects, a plurality of programming structures, a plurality of distributed computing resources, a plurality of cloud computing resources, or combinations thereof. In various embodiments, the one or more software modules comprise, by way of non-limiting examples, a web application, a mobile application, a standalone application, and a distributed or cloud computing application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on a distributed computing platform such as a cloud computing platform. In some embodiments, software modules are hosted on one or more machines in one location. In other embodiments, software modules are hosted on one or more machines in more than one location.

Databases

In some embodiments, the platforms, systems, media, and methods disclosed herein include one or more databases, or use of the same. In view of the disclosure provided herein, those of skill in the art will recognize that many databases are suitable for storage and retrieval of control system information. In various embodiments, suitable databases include, by way of non-limiting examples, relational databases, non-relational databases, object-oriented databases, object databases, entity-relationship model databases, associative databases, XML databases, document oriented databases, and graph databases. Further non-limiting examples include SQL, PostgreSQL, MySQL, Oracle, DB2, Sybase, and MongoDB. In some embodiments, a database is Internet-based. In further embodiments, a database is web-based. In still further embodiments, a database is cloud computing-based. In a particular embodiment, a database is a distributed database. In other embodiments, a database is based on one or more local computer storage devices.

Control Systems

A control system may comprise a framework to coordinate operations between protocols, connections, and devices, so they may be executed properly and on schedule. In some embodiments, the operations may be executed with one or more logic elements comprising a programmable logic controller (PLC), programmable logic array (PLA), programmable array logic (PAL), generic logic array (GLA), complex programmable logic decide (CPLD), field programmable gate array (FPGA), or application-specific integrated circuit (ASIC). The control system may comprise one or more network communication protocols that may be standard network communication protocols, non-standard network communication protocols, or a combination thereof. In some embodiments, the standard network communication protocols are process field bus (Profibus), process field net (Profinet), highway addressable remote transducer (HART), distributed network protocol (DNP3), Modbus, open platform communication (OPC), building automation and control networks (BACnet), common industrial protocol (CIP), or ethernet for control automation technology (EtherCAT). In some embodiments, the control system may be an industrial control system (ICS), distributed control system (DCS), supervisory control and data acquisition (SCADA) system, embedded system, or a combination thereof.

In some embodiments, where the control systems may include industrial and manufacturing facilities (i.e., an ICS), the control system may support production and processing objectives on a mass-scale. An ICS may comprise one or more of PLCs, remote terminal units, intelligent electronic devices, engineering workstations, HMI, data historians, communication gateways, and front-end processors. In some embodiments, an ICS may have different controllable states as steps of a process, and may use an open communication protocol (e.g., Modbus for ICS networks). Further, the open communication protocol, such as Modbus, may not be encrypted at any point during the communication, thus increasing the likelihood of an attack. For example, A generic ICS feedback control loop is exemplary illustrated in FIG. 1.

An ICS feedback loop may generally comprise a human-machine interface (HMI) 205. The HMI 205 may be a user interface (e.g., GUI) that connects a person to one or more components (e.g., equipment, network, etc.) in the ICS. The HMI 205 may send a query to a programmable logic controller (PLC) 210 regarding the state or function of components in the ICS, and the PLC 210 may send a response back to the HMI 205, which may be displayed on the user interface. In some embodiments, the PLC 210 may send status information regarding components of the ICS to the HMI 205. In some embodiments, the PLC 210 may implement control strategies using a system comprising a microprocessor for managing components in the ICS.

In some cases, the components may be a physical device 215, such as equipment in the ICS. In some cases, the equipment may be on-site or remote. In some examples, the PLC 210 may control a physical device 215 or a plurality thereof, such as control motors, valves, switches, etc. In some examples, the PLC 210 may control a physical device 215 based on measurements obtained from sensors 220, which may determine when and how the physical device 215 should operate. In some cases, the measurements may be physical measurements obtained from sensors 220, such as pressure, volume, temperature, humidity, torque, vacuum, motion, etc. In some cases, the sensor 220 may be a standalone sensor or an integrated sensor. In some examples, the integrated sensor may be part of a control device comprising an actuator. In further embodiments, the PLC 210 may receive commands for the physical device 215 to perform functions (e.g., pump actuation, stirrer operation, conveyor belt operation, etc.) from the HMI 205.

Safety, reliability, and resilience to cyberattacks may be key attributes for the successful operation of an ICS. These attributes may be threatened due to an increase in attack surfaces due to IOT devices, difficulties in performing patch updates to components in the ICS from downtime and vendor varieties, or an accumulation of small errors over time that may result in larger failures. An anomaly detection system for recognizing threats, such as those described herein, may increase the likelihood of the successful operation of an ICS. In some embodiments, data obtained related to the ICS may be used for anomaly recognition. In some cases, the data may be obtained from one or more sources, such as components of the ICS or communicably coupled to the ICS (e.g., data from a network, such as Modbus commands, sensor data, etc.). In some cases, the data from one or more sources may be analyzed and compared to previous data for anomalies. For example, a pressure sensor may have a normal operating range, and a pressure value outside that range may be flagged as an anomaly. In a further example, network traffic patterns may be analyzed, and an unusually high or low traffic pattern may be flagged as an anomaly. In some cases, the data from multiple sources may be analyzed and compared to one another for anomalies. In some examples, having two different models (i.e., ML algorithms) predict the state of multiple sources may help identify miscommunication errors and the occurrence of an anomaly. For example, sensor data and network traffic patterns may be analyzed and compared to one another to better assess when an anomaly has occurred. The anomaly detection as described herein, by way of non-limiting example, for an ICS, may be performed with a classification system employing ML techniques. In some embodiments, the classification system may employ neural networks.

Classification System for a Control System

An architecture comprising neural networks may be used for predicting the states of components for a control system. The states may be predicted by the neural networks using classification of behavioral patterns of components in the control system (e.g., 'FAST', 'SLOW', 'ON', 'OFF', etc.). The classification may be compared to past classifications or may be compared to other components in the control system for multi-view classification in order to identify the occurrence of an anomaly.

Figure 3:
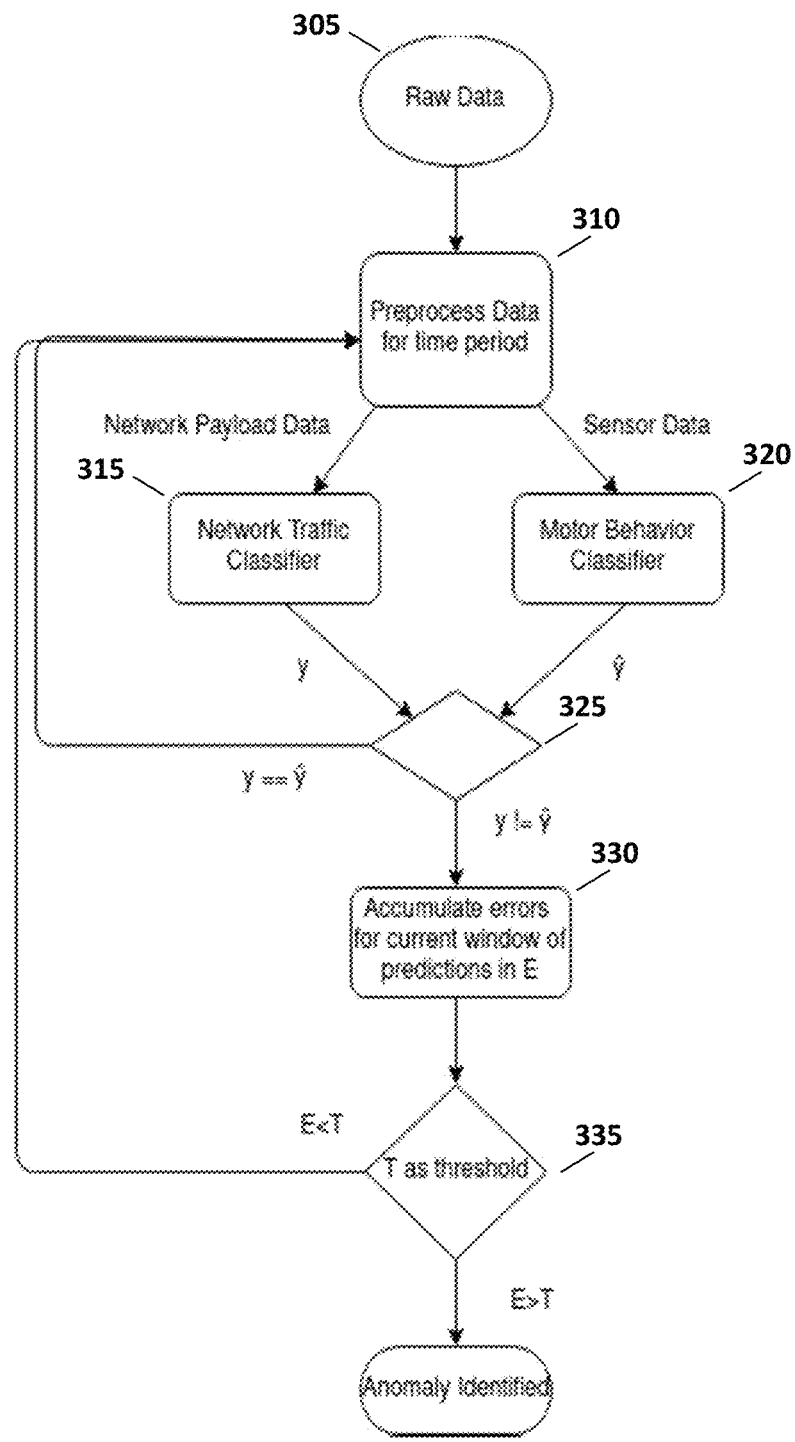
FIG. 3 shows a non-limiting example of a multi-view classification system for a control system; in this case, for an ICS.

An example of a multi-view classification system for a control system, in this case, by way of non-limiting example, for an ICS, is illustrated in FIG. 3. First, raw data 305 may be obtained from components in the control system or in communication with the control system. Raw data 305 may comprise of one or more inputs from components as described herein. In some embodiments, the raw data 305 may comprise sensor data from equipment in the control system (e.g., accelerometer or gyrometer in an ICS). In alternative embodiments, the sensor data may be obtained from equipment in an embedded system (e.g., glucose sensors in an insulin pump, sensors in a pacemaker, etc.). In some embodiments, the raw data 305 may comprise network data from a network in communication with the control system. The network data may comprise packet data, metadata, or a combination thereof. In some cases, the packet data may comprise a packet's header, payload, trailer, or any combination thereof. In some further cases, the packet data from the packet's payload may comprise bit streams. In some embodiments, the network data may comprise of interarrival times, which may be referred to as packet time deltas or the first difference. In such embodiments, each packet may contain a timestamp for when it arrives to the ICS or a component of the ICS, and taking the difference between two adjacent timestamps may yield the amount of time between each packet arrival. The interarrival times (or time between packet arrivals) may change (e.g., increase or decrease) during a change in the state of a control system, which may then return to a baseline interarrival time. Thus, in such embodiments, interarrival times may be used for detecting anomalous state changes.

Preprocessing may be performed on the raw data 305 using at least one logic element, as described herein. In some embodiments, the multi-view classification, as exemplary illustrated in FIG. 3, may preprocess data for time period 310, in which the time period of the raw data 305 may be adjusted. In some cases, preprocessing may comprise of normalizing distributions of one or more inputs of the raw rate 305 (e.g., the sensor data and the network data). In some examples, a normalizing operation may adjust a distributions' mean, variance, higher-ordered moments, or a combination thereof. In some cases, preprocessing may comprise of checking time alignment between one or more inputs of the raw data 305 (e.g., the sensor data to the network data). In some examples, the checking operation may resample any one of the inputs of the raw data 305 (e.g., as i.e., the sensor data, the network data, or any combination thereof) for the time alignment between them. The resampling may result in the inputs of the raw data 305 having a same number of samples. In some examples, the resampling comprises downsampling. In some examples, the resampling comprises upsampling. In some examples, the resampling comprises unsampling. In some cases, preprocessing may comprise of selecting a time window for accumulating the one or more inputs of the raw data 305 (e.g., sensor data and the network data). In some examples, this selection operation may comprise of windowing to adjust the time window for accumulating any one of the inputs of the raw data 305. In some examples, the windowing accounts for delays in any one of the inputs of the raw data 305. In some embodiments, using a smaller time window may allow control of false positive to false negative ratio of the classification, which can be optimized based on the costs of a misclassification. In some embodiments, the size of the time window may be empirically chosen from observing the patterns of the raw data 305.

The data from preprocessing operations, as described herein, may be fed into one or more ML algorithms for identifying single or multi-stage attacks, or detecting anomalies in a control system. In some examples, these attacks or anomalies may be detected by analyzing packet streams and content from a network. In some examples, the network may use one or more communication protocol (e.g., the Modbus protocol). In some examples, these attack or anomalies may be detected from time series data of sensors. In some embodiments, the one or more ML algorithms may be supervised, semi-supervised, or unsupervised for training to identify anomalies. In some embodiments, the one or more ML algorithms may perform classification or clustering to identify anomalies or attacks. In some embodiments, the one or more ML algorithms may comprise classical ML algorithms for performing clustering to identify outliers. Classical ML algorithms may comprise of algorithms that learn from existing observations (i.e., known features) to predict outputs. In some cases, the classical ML algorithms for performing clustering may be K-means clustering, mean-shift clustering, density-based spatial clustering of applications with noise (DBSCAN), expectation-maximization (EM) clustering (e.g., using Gaussian mixture models (GMM)), agglomerative hierarchical clustering, or a combination thereof. In some embodiments, the one or more ML algorithms may comprise classical ML algorithms for classification. In some cases, the classical ML algorithms may comprise logistic regression, naïve Bayes, K-nearest neighbors, random forests or decision trees, gradient boosting, support vector machines (SVMs), or a combination thereof. In some embodiments, the one or more ML algorithm may employ deep learning. A deep learning algorithm may comprise of an algorithm that learns by extracting new features to predict outputs. The deep learning algorithm may comprise of layers, which may comprise a neural network.

Neural Networks

Neural networks may comprise of connected nodes in a network, which may perform functions, such as transforming or translating input data. In some examples, the output from a given node may be passed on as input to another node. In some embodiments, the nodes in the network may comprise of input units, hidden units, output units, or a combination thereof. In some cases, an input node may be connected to one or more hidden units. In some cases, one or more hidden units may be connected to an output unit. The nodes may take in input and may generate an output based on an activation function. In some embodiments, the input or output may be a tensor, a matrix, a vector, an array, or a scalar. In some embodiments, the activation function may be a Rectified Linear Unit (ReLU) activation function, a sigmoid activation function, or a hyperbolic tangent activation function. In some embodiments, the activation function may be a Softmax activation function. The connections between nodes may further comprise of weights for adjusting input data to a given node (i.e., to activate input data or deactivate input data). In some embodiments, the weights may be learned by the neural network. In some embodiments, the neural network may be trained using gradient-based optimizations. In some cases, the gradient-based optimization may comprise of one or more loss functions. In some examples, the gradient-based optimization may be conjugate gradient descent, stochastic gradient descent, or a variation thereof (e.g., adaptive moment estimation (Adam)). In further examples, the gradient in the gradient-based optimization may be computed using backpropagation. In some embodiments, the nodes may be organized into graphs to generate a network (e.g., graph neural networks). In some embodiments, the nodes may be organized into one or more layers to generate a network (e.g., feed forward neural networks, convolutional neural networks (CNNs), recurrent neural networks (RNNs), etc.). In some cases, the neural network may be a deep neural network comprising of more than one layer.

In some cases, the neural network may comprise one or more recurrent layer. In some examples, the one or more recurrent layer may be one or more long short-term memory (LSTM) layers or gated recurrent unit (GRU), which may perform sequential data classification and clustering. Thus, future predictions may be made by the one or more recurrent layers according to the sequence of past events since data ordering is considered. Further, the recurrent layer may retain or "remember" important information, while selectively "forgetting" what is not essential in the classification model. In some embodiments, the neural network may comprise one or more convolutional layers. The input and output may be a tensor representing of variables or attributes in a data set (i.e., features), which may be referred to as a feature map (or activation map). Thus, the one or more convolutional layers may be referred to as a feature extraction phase. In some cases, the convolutions may be one dimensional (1D) convolutions, two dimensional (2D) convolutions, three dimensional (3D) convolutions, or any combination thereof. In further cases, the convolutions may be 1D transpose convolutions, 2D transpose convolutions, 3D transpose convolutions, or any combination thereof. In some examples, one-dimensional convolutional layers may be suited for time series sensor data analysis since it may classify time series through parallel convolutions. In some examples, convolutional layers may be used for analyzing raw data in the payload of a network packet. Further, the convolutional layers may be efficient for detecting properties in payload bit patterns of a control system since they may follow a recognizable pattern (e.g., payload bit patterns in an ICS follow recognizable ICS command patterns).

The layers in a neural network may further comprise one or more pooling layers before or after a convolutional layer. The one or more pooling layers may reduce the dimensionality of the feature map using filters that summarize regions of the matrix. This may down sample the number of outputs, and thus reduce the parameters and computational resources needed for the neural network. In some embodiments, the one or more pooling layers may be max pooling, min pooling, average pooling, global pooling, norm pooling, or a combination thereof. Max pooling may reduce the dimensionality of the data by taking only the maximums values in the region of the matrix, which helps capture the significant feature. In some embodiments, the one or more pooling layers may be one dimensional (1D), two dimensional (2D), three dimensional (3D), or any combination thereof. The neural network may further comprise of one or more flattening layers, which may flatten the input to be passed on to the next layer. In some cases, the input (e.g., feature map) may be flattened by reducing it to a one-dimensional array. The flattened inputs may be used to output a classification of an object (e.g., binary classification of an image, such as cat or dog, or of a system's performance, such as normal or abnormal, or multi-class classification identifying handwritten digits, etc.). The neural networks may further comprise of one or more dropout layers. Dropout layers may be used during training of the neural network (e.g., to perform binary or multi-class classifications). The one or more dropout layers may randomly set certain weights as 0, which may set corresponding elements in the feature map as 0, so the neural network may avoid overfitting. The neural network may further comprise of one or more dense layers, which comprise a fully connected network. In the dense layer, information may be passed through the fully connected network to generate a predicted classification of an object, and the error may be calculated. In some embodiments, the error may be backpropagated to improve the prediction. The one or more dense layers may comprise of a Softmax activation function, which may convert a vector of numbers to a vector of probabilities. These probabilities may be subsequently used in classifications, such as classifications of states in a control system as described herein. In some embodiments, the classifications of states from one or more components in a control system may be compared to detect the occurrence of an anomaly.

An architecture for anomaly detection may comprise two neural networks for dual neural network state prediction as exemplary illustrated in FIG. 3. The neural networks may use different sets of features for prediction, such as those obtained from network data and sensor data. Although two neural networks are employed in this example, one of skill in the art will appreciate that any one of the ML algorithms as described herein may be used which may be suited for a particular input data set and desired output. One of skill in the art will also appreciate that more than two ML algorithms may be employed in this architecture. Further, one of skill in the art will appreciate that the ML algorithms as described herein may be combined or that more than one input data may be fed into a single ML algorithm (e.g., the network data and sensor data may be fed into the same algorithm).

In the dual neural network architecture illustrated in FIG. 3, the network data (e.g., network payload data) may be fed into a neural network comprising a network traffic classifier 315. The neural network comprising the network traffic classifier 315 may be trained to learn "normal" network traffic patterns and classify the network traffic patterns in a given time period by comparing it to the "normal" network traffic pattern. The network traffic classifier 315 may use the comparison to classify the state of the network traffic pattern in a given time period (e.g., "FAST", "SLOW", "MEDIUM", "HALT", "OFF", "REVERSE", etc.). The output from the network traffic classifier 315 may comprise of a classified state, illustrated as y in FIG. 3. In further embodiments, the neural network may be trained to classify network data that is encrypted through various methods (e.g., Electronic Code Book, Cipher-Block Chaining, Cipher FeedBack, XOR encryption, etc.). In some embodiments, the sensor data may be fed into a behavioral classifier. In some cases, the sensor data may be time series data. In the case of an ICS, the sensor data may be time series data obtained from an accelerometer, a gyrometer, or any other equipment of the ICS. Further, the behavioral classifier may comprise a motor behavioral classifier 320. The neural network comprising the behavioral classifier (e.g., motor behavioral classifier 320) may be trained to learn "normal" sensor ranges or values for a given time period, and classify the sensor data in a given time period by comparing it to the "normal" range or values. The behavioral classifier may use the comparison to classify the state of the sensor data in a given time period (e.g., "FAST", "SLOW", "MEDIUM", "HALT", "OFF", "REVERSE", etc.). The output from the behavioral classifier may comprise of another classified state, illustrated as ŷ in FIG. 3.

Discrepancy Aggregator

The classified states, y and ŷ from the neural networks comprising classifiers, may be compared to one another using a discrepancy aggregator which may comprise at least one logic element. In some embodiments, the classified states may match (i.e., y==ŷ) or be reasonably similar. In such embodiments, consensus from the two neural networks is achieved and the classification system may return to preprocess data for time period 310 for new raw data 305. In some cases, the classified states may be logged, or data may be used for comparison against new raw data 305. In alternative embodiments, the classified states may lack consensus (i.e., y!=ŷ). The discrepancy aggregator may then accumulate errors (or difference) for the current time window (or time period) of predictions 325 (i.e., E in FIG. 3) between the classified states. The accumulation of errors, E, may then be compared to a threshold, T. In some embodiments, the threshold may be empirically chosen from observing the patterns of the raw data 305. In some embodiments, T as a threshold 330, may be set according to an average discrepancy rate between the classified states. In some embodiments, T as a threshold 330, may be dynamically changed over time. In some embodiments, the threshold and the time window may be inversely related (i.e., the greater the time window, the lower the threshold may be needed). If the accumulation of errors is less than the threshold (i.e., E<T), then the classification system may return to preprocess data for time period 310 for new raw data 305. If the accumulation of errors is greater than the threshold (i.e., E>T), an anomaly is identified 335. The anomaly may comprise of faulty or abnormal behavior of components in the control system or in communication with the control system, or may be indicative of a cyberattack.

EXAMPLES

The following illustrative examples are representative of embodiments of the software applications, systems, and methods described herein and are not meant to be limiting in any way.

Example 1—Test Bed of ICS Operations

Figure 4:
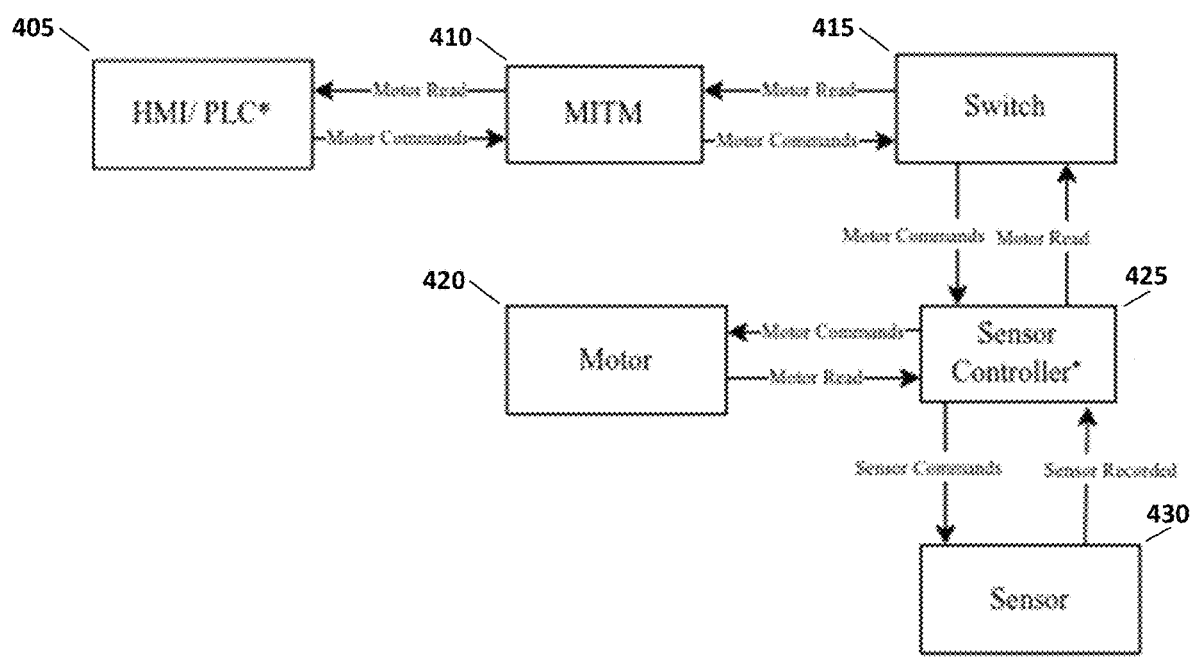
FIG. 4 shows a non-limiting example of an architecture for an ICS testbed; in this case, for a MITM attack.

An ICS test bed to detect anomalies using packet and sensor data patterns was created according to the architecture illustrated FIG. 4. This test bed used two streams of data under the assumption that during normal operation, the patterns of command payloads would result in specific patterns of sensor behavior. The architecture was created for a man-in-the-middle (MITM) 410 attack. A MITM 410 attack may comprise of a scenario in which an attacker may secretly relay and alter communications between two or more sources in an ICS without their knowledge. The testbed comprised a MITM 410 between an HMI/PLC 405 and a switch 415.

The set up comprised a Tolomatic industrial motor, which received commands from the HMI/PLC 405. The data flow in FIG. 4 was as followed; 1) the HMI/PLC 405 sent a continual stream of motor commands to the switch 415 (e.g., off, on, change of speed, etc), 2) the commands from the switch 415 were sent to a sensor controller 420 comprising an inline Raspberry Pi for logging purposes, 3) the sensor controller 420 forwarded messages to a motor 425 or a sensor 430, and 4) the motor 425 and sensor 430 responded with a continual stream of data that was read from the motor or recorded by the sensor, which was also routed through the inline Raspberry Pi. Here, the sensor 430 recorded accelerometer and gyroscopic data related to the motor 425. The accelerometer and gyroscopic sensor data were stored as Comma Separated Values (CSVs) in the X, Y, and Z directions that represented the acceleration and orientation of the attached sensor separated in the three-dimensional space. This data was collected as a constant stream as the sensor controller continuously logged data from the motor at a fixed sample rate of 10 thousand samples per second. The gyrometer data as logged as floating-point values represent angular velocity as degrees per second. The accelerometer data measured the force on the motor in that direction in meters per second squared. In total, six sensor data streams are used for sensor classification.

This ICS ted bed system was constructed to communicate using Modbus packets between the HMI/PLC 405 and the motor 425. Communication was structured such that all messages sent from the HMI/PLC 405 to the motor 425 resulted in a response message sent back to the HMI/PLC 405. Modbus packets within the system were therefore the Read/Write commands sent to the motor 425, and motor data sent back to the HMI/PLC 405. Rather than being a constant stream of data input, each payload arrived at different times from the sensor controller 420. The payload data was converted from its original byte format to binary, since network data was preprocessed from PCAP files. Each individual data payload was about 53 bytes between 0 to 255, which were converted to binary for machine learning input changing the input width from 53 bytes to 424 bits.

Figure 6A:
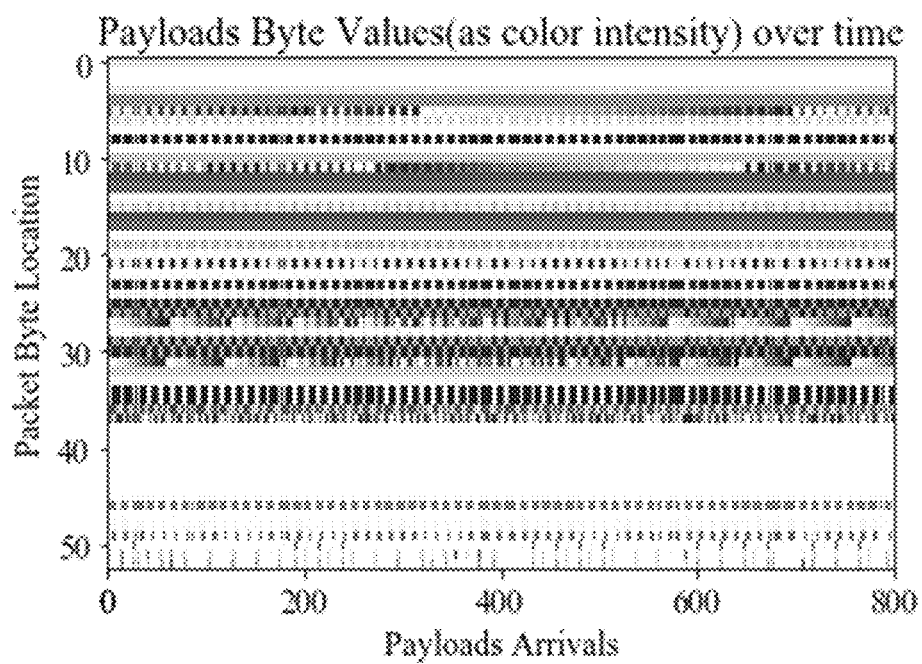
FIGS. 6A-6D show raw data obtained from a trial during an MITM attack.
Figure 6B:
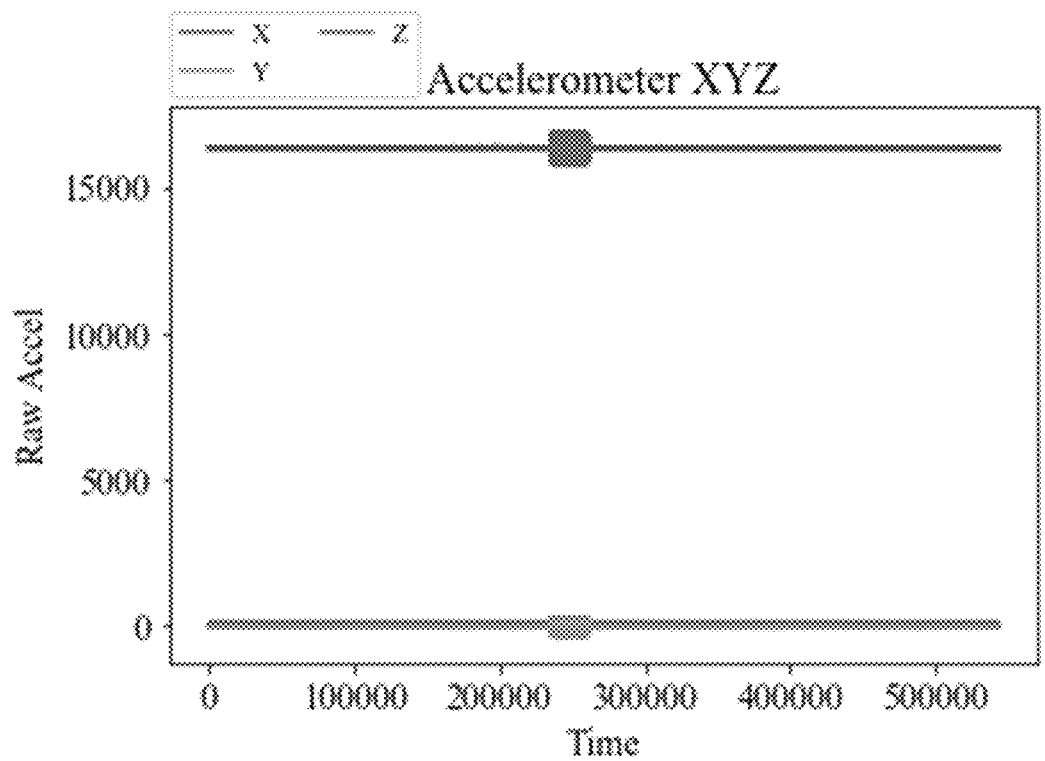
Figure 6C:
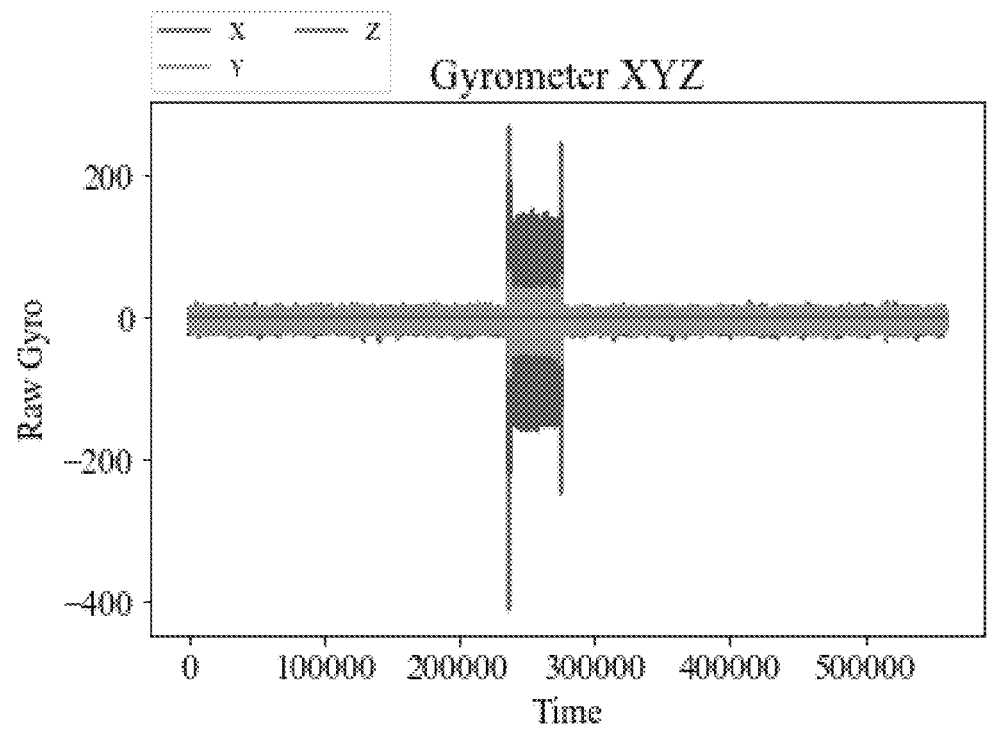
Figure 6D:
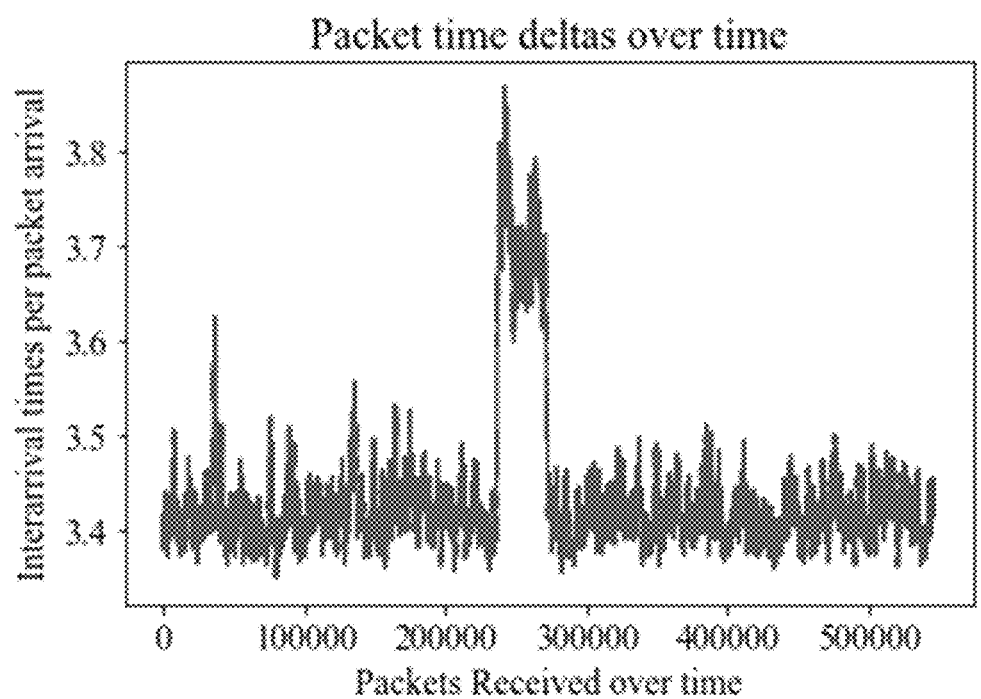

Raw data obtained from a trial during an MITM attack is shown in FIGS. 6A-6D. The payload data was represented in its byte format in FIG. 6A, where each of the 53 bytes were vertically stacked and pixel color intensity represented the 0-255 value for that byte. Thus, the color changes represent how byte locations in some packet have static, cyclic, or random values. The accelerometer and gyrometer sensor data are shown in FIGS. 6B and 6C, respectively, where a state change from the random short burst of speed and forces were observed. FIG. 6D illustrates packet deltas over time, as described herein, although this data was not used to predict the ICS states in the present test case.

Here, an error was defined as a difference between the predicted state of two CNNs, which classified the states of the payload or sensor data into one of six possible ICS states: 'FAST', 'HALT', 'MEDIUM', 'OFF', 'REVERSE', and 'SLOW'.

Preprocessing

Preprocessing steps were performed on the raw sensor (accelerometer and gyrometer) and packet data. First, normalization was performed on the accelerometer sensor data and packet data. Normalization was not necessary for the gyrometer sensor data since each axis was already centered around 0 with a constant standard deviation. For the accelerometer sensor data, the z-axis was scaled down by dividing by 16767, which was the maximum value that the hardware sensors could read. This min-max scaling was done in order to reduce the large magnitude of forces in that direction to be between 0 and 1. The absolute values of the raw values were taken in order to specifically detect the magnitude of the rotational and straight-line forces. This was done since the direction itself was oscillatory around the axis, so the magnitude was the primary source of classification information. For this reason, an absolute value was used to reduce the neural network learning needed to find the magnitude. The payload data contained constant noise from a variety of packets that ping and maintain the connection. By taking a moving average of 100 of the packet bitstreams, a constant amount of noise on the network was accounted and the classification was improved.

Next, time alignment between the raw data was checked, so that the sensor and packet data were from the same time period. The two data sets had varying amounts of data for each period of time because the sensor data arrived in constant intervals while the packet is arrived sporadically. In order to have around the same amount of data for the time period, the sensor data was downsampled by taking every other sensor reading. This reduction of sensor data to half its readings allowed payload data to be aligned to its corresponding sensor readings in time.

Finally, a time window was selected to accumulate the raw data. The packet payload messages sent on the network took some time to impact the ICS actuators, especially mechanical peripherals because of startup transients. This added delay between the observed state from the PCAP analysis and the observed state from the sensors. Further, the packet payload arrival time varied depending on whether an ICS state transition was occurring, which gave it a variable sampling rate. This meant each payload could not directly be correlated with a sensor output because many payloads could be correlated to only a few ICS sensor changes, and vice versa. The timing effects could be mitigated by using a larger input size. As sample input size increased, the variable sampling rate and differences among sample rates became less impactful. 100 samples of payload data and 100 samples of sensor data (ending at the same point in time) as input for each CNN model was determined to be a conservative sample size that worked for the classification, since sensor visuals seemed to show that the state change happened over less than 100 samples. By increasing the sample input size to the ratio of the number of samples it took to change states, misclassification errors were reduced to a single prediction during an ICS state change.

CNN Architecture

Figure 5:
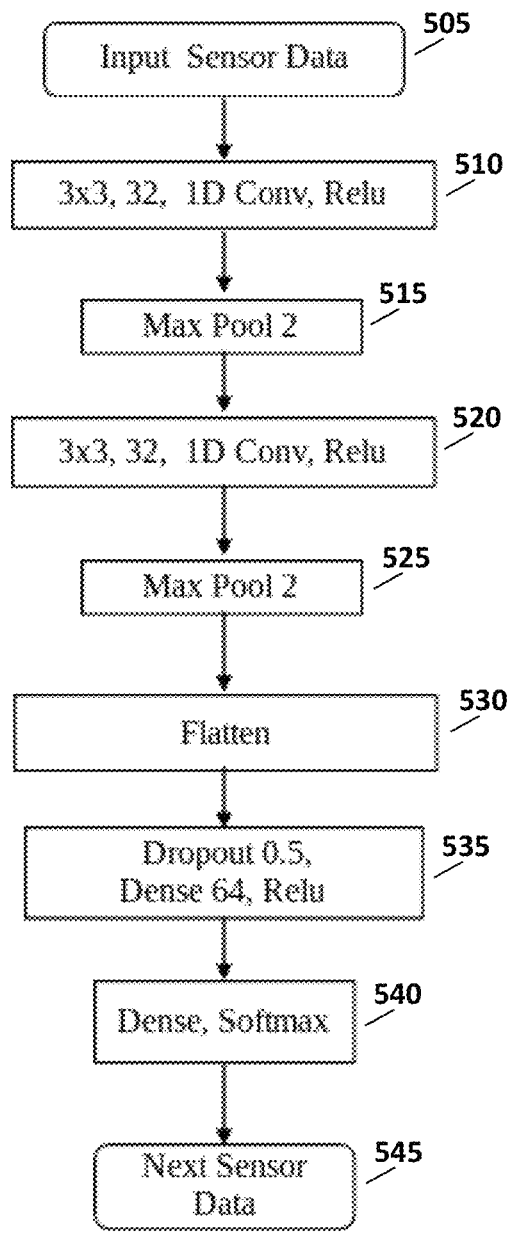
FIG. 5 shows a non-limiting example of a dual-CNN architecture.

The data from the ICS testbed was fed into a dual-CNN architecture according to the architecture shows in FIG. 5. The input 505 was either raw time series sensor data or bit streams from the payloads in packets over time. Training, validation, and testing splits were performed at the ratio of 70:20:10 to ensure the model can accurately detect ICS states from payloads and sensors. To create the model, the Keras package was used for design and training. The model uses a combination of convolutional layers 510/520, max pooling layers 515/525, a flattening layer 530, a dropout layer 535, and a dense neural network layer 540. All activation functions were ReLU except for the final Softmax activation for classification in the dense layer 540. The loss function employed for training was cross entropy across the six possible ICS states. An adaptive momentum (ADAM) optimizer was employed with a learning rate of 1e-5 and was used to iteratively update the weights. The model was trained for 100 epochs and dropout (dropout layer 535) was used to help prevent overfitting.

The CNN models were first trained and tested on windows of 100 samples for both payload and sensor data streams. For the anomaly detection, the occurrence of errors (or disagreements in the states) between the two CNNs were monitored. Since the trials were about 500,000 samples each and the models predicted from 100 samples, there was be about 5000 predictions per trial. A sliding window of size 20 was used to calculate error prediction percentage over time. In other words, every group of 20 predictions, produced an error rate. FIGS. 6A-6D shows the visualization of results of both the payload and gyrometer sensor classifiers, and the error rate per moving window of 20 predictions. The selection of a moving window error rate of 20 was used because, while random misclassification can occur, after around 20 predictions the error rate was observed to be fairly low. A threshold of 18% for the error rate is used to identify anomalies since the baseline error rate for a window of size 20 is around 15% for our models.

Results

Figure 7A:
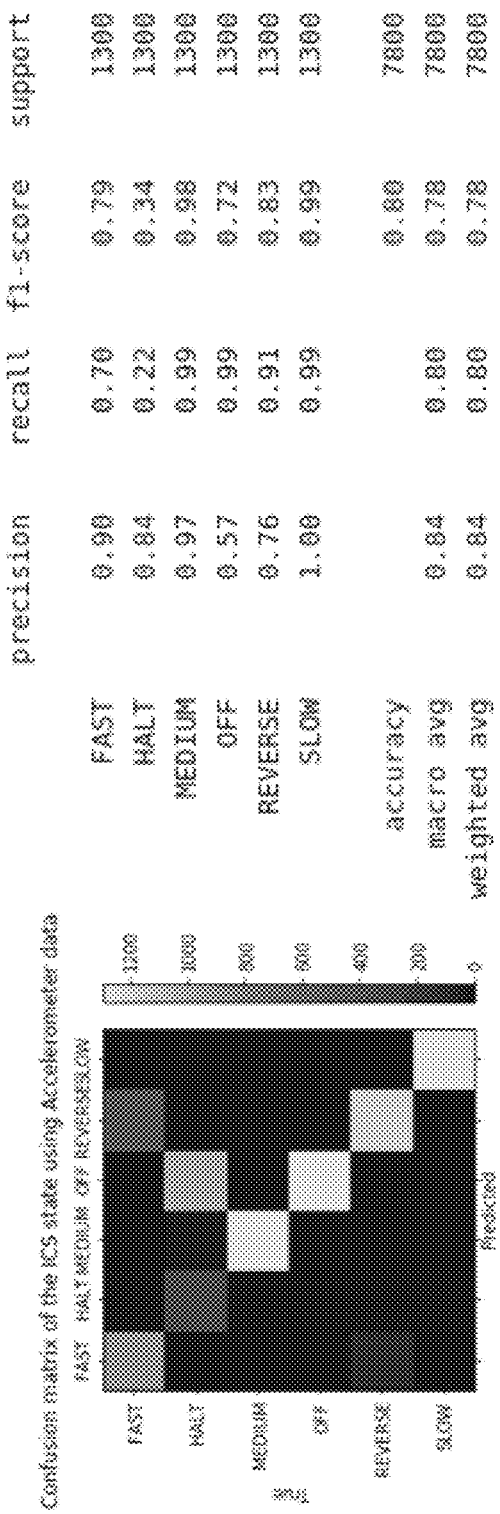
FIGS. 7A-7C show confusion matrices for the raw sensor and packet data.
Figure 7B:
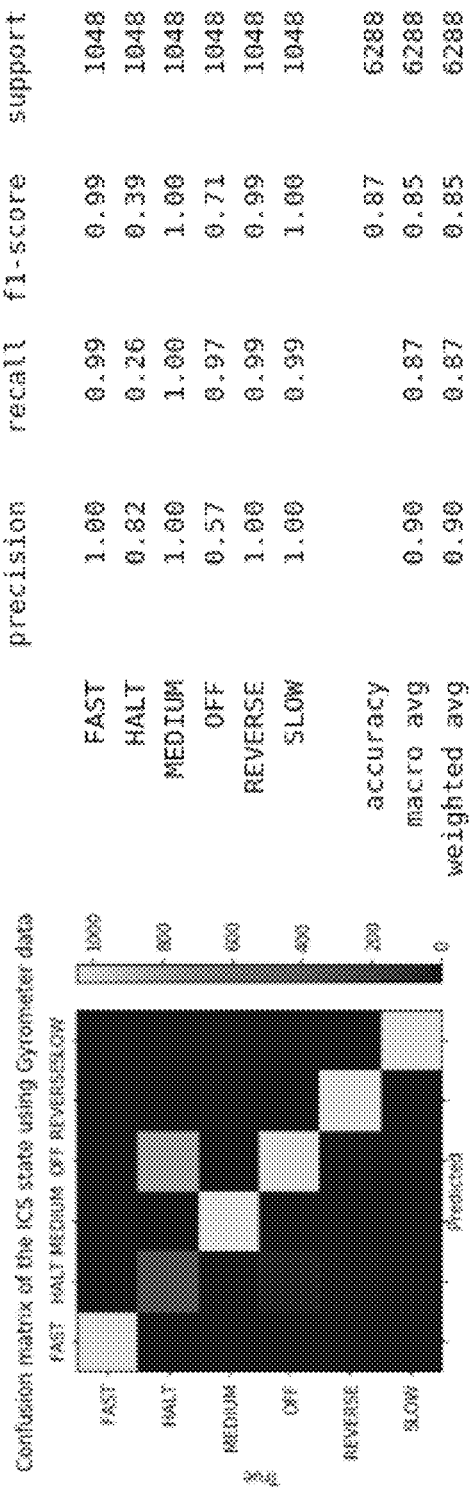
Figure 7C:
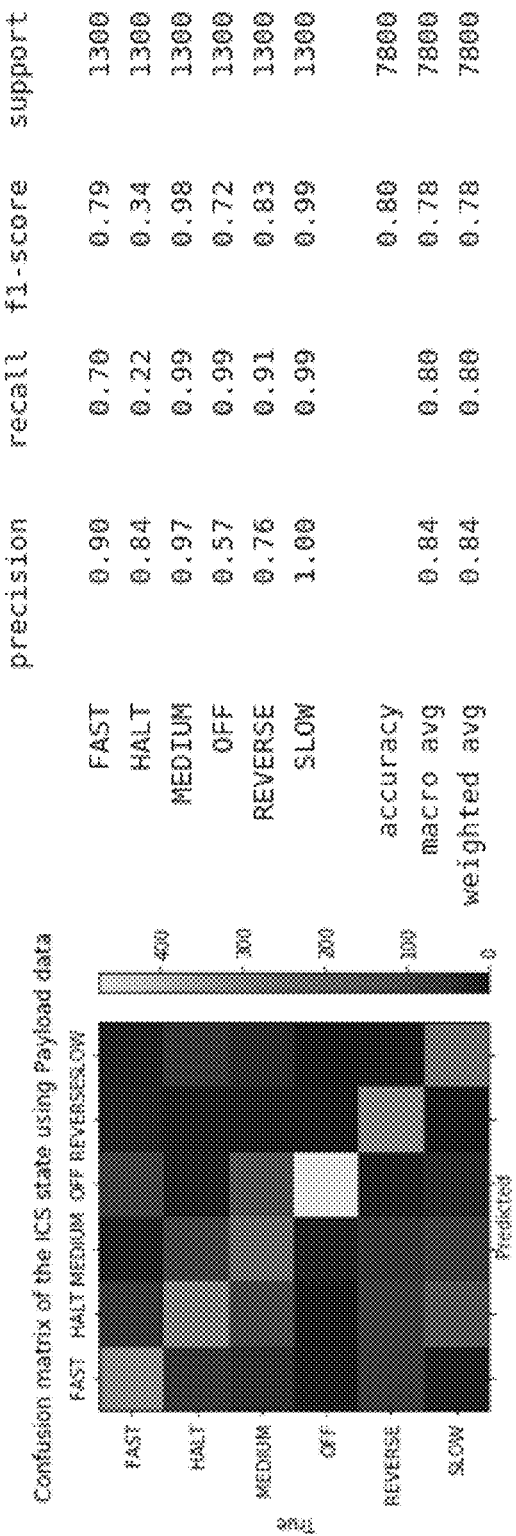

The training data was analyzed using confusion matrices for the raw data to visualize the effectiveness of the classifiers. The raw sensor from the accelerometer and gyrometer are shown in FIG. 7A and FIG. 7B, respectively, and packet data is shown in FIG. 7C. The F1 scores and weighted averages are also shown in these figures. The best performing model used the gyrometer sensor data (FIG. 7B), with near perfect classification except for misclassifications for the 'halt' and 'off' states.

Figure 8A:
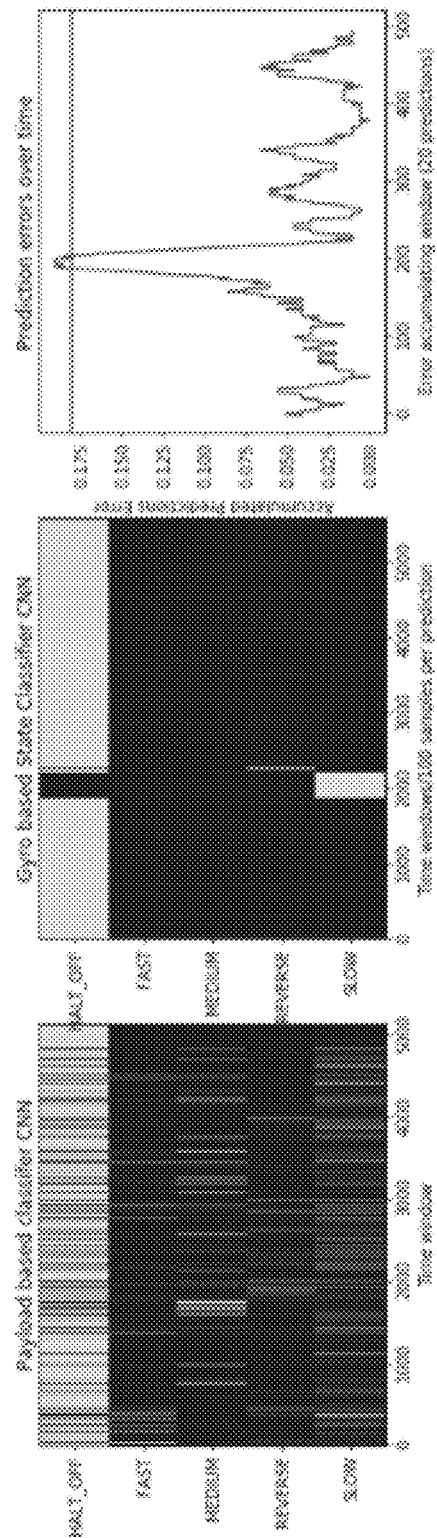
FIGS. 8A-8C show classifier outputs tracking the difference between classified states.
Figure 8B:
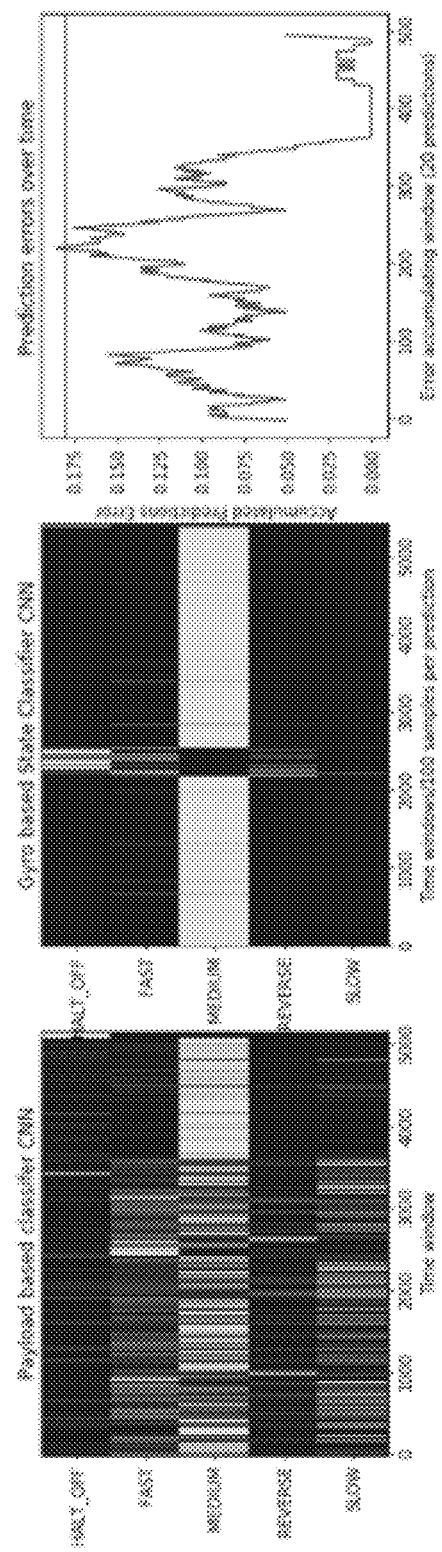
Figure 8C:
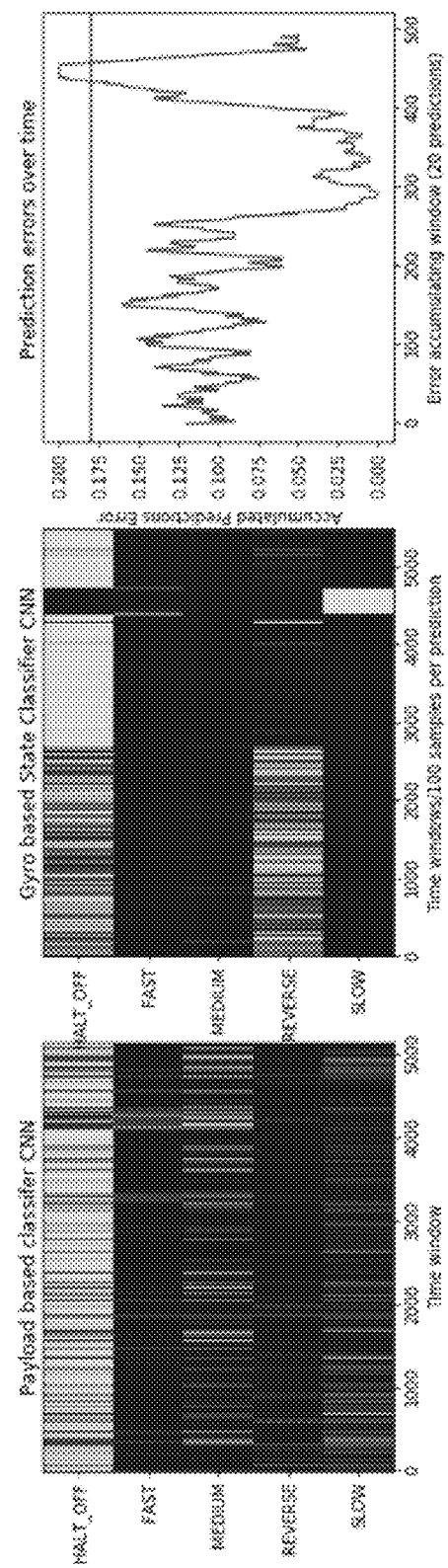

The results of combining the classifier outputs for tracking the number of occurrences when the classified states for the gyrometer sensor data and packet data differed are shown in FIGS. 8A-8C. When the accumulation of differences in a given time window surpassed a certain threshold, the anomaly was marked. A threshold of 18% worked well in flagging the anomalies. FIGS. 8A-8C show how comparing the classified states in an unsupervised way allowed for a robust anomaly detection.

Figure 9:
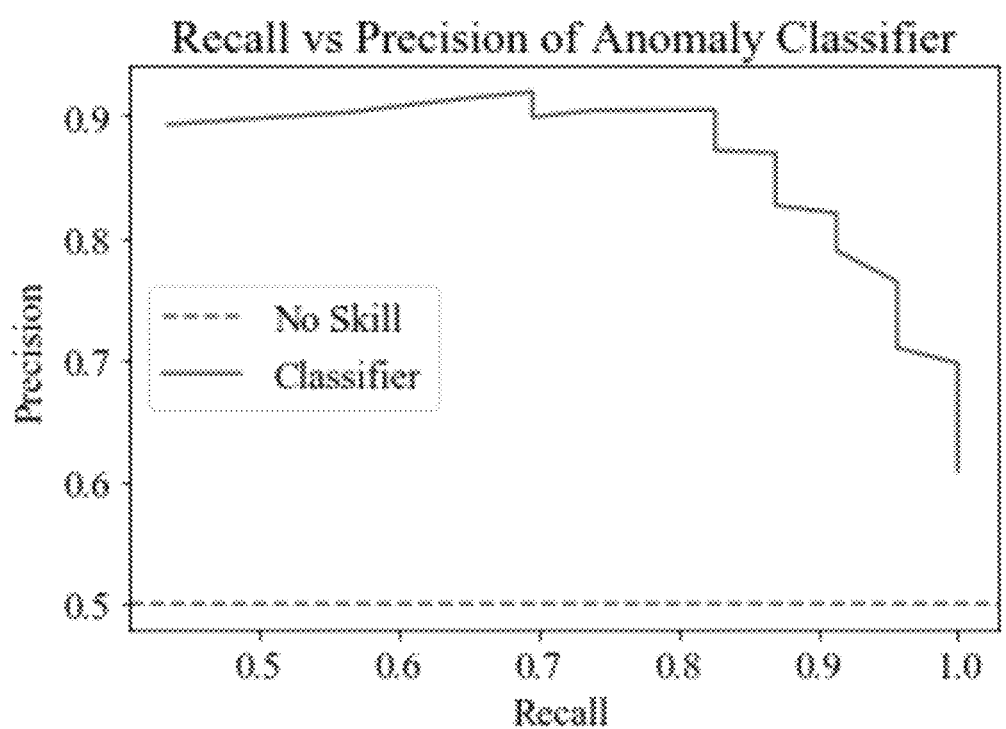
FIG. 9 shows precision-recall curve (PRC) of the classifier performances.

A precision-recall curve (PRC) was used to detect the precision to recall ratio as the threshold of anomaly detection was adjusted. This method revealed the degree at which the overall classifier performed greater than random chance. By sweeping the threshold from 0.0% to 100.0% of errors within a window, a diagram as shown in FIG. 9 was created where, as recall of anomalies increased, the false positives also increased, and precision decreased. Detecting true positives provides utility since this model had consistent results at detecting the baseline (true negative) at every threshold and had minimal false negatives. Further, to improved visualization through the PRC curve, emphasis on recalling true positives was important since the model had to be able to detect and mitigate threats before they caused permanent major failure to the ICS system. The calculated area under the precision-recall curve (AUPRC) is about 86% in FIG. 9.

From the precision-recall curve, the optimal threshold was taken where precision and recall are equal (i.e., equal error rate point or EER). At this threshold of around 0.17, the model was run on our test set. A confusion matrix and statistics were used to evaluate the combined, unsupervised anomaly detector whose performances were shown to have an F1 score: 0.89, Sensitivity (Recall): 0.87, and Precision: 0.88. The results were obtained by analyzing the true positive and false negatives from anomaly injections and false positives and true negatives from baseline. These results represented the strength of the classifier after it was tuned to be an optimal threshold for this dataset.

For the classifier, the precision of detection reached about 0.88 and its recall about 0.87. Detecting this percentage of anomalies generated was quite strong because the inserted anomalies in the system were of relatively short duration. Though some anomalies were not detected, a more sustained MITM attack would eventually trigger an alarm. Overall, the classifier was robust to the random noise of multiple classifiers and could accurately distinguish anomalies from baseline data.

Figure 10:
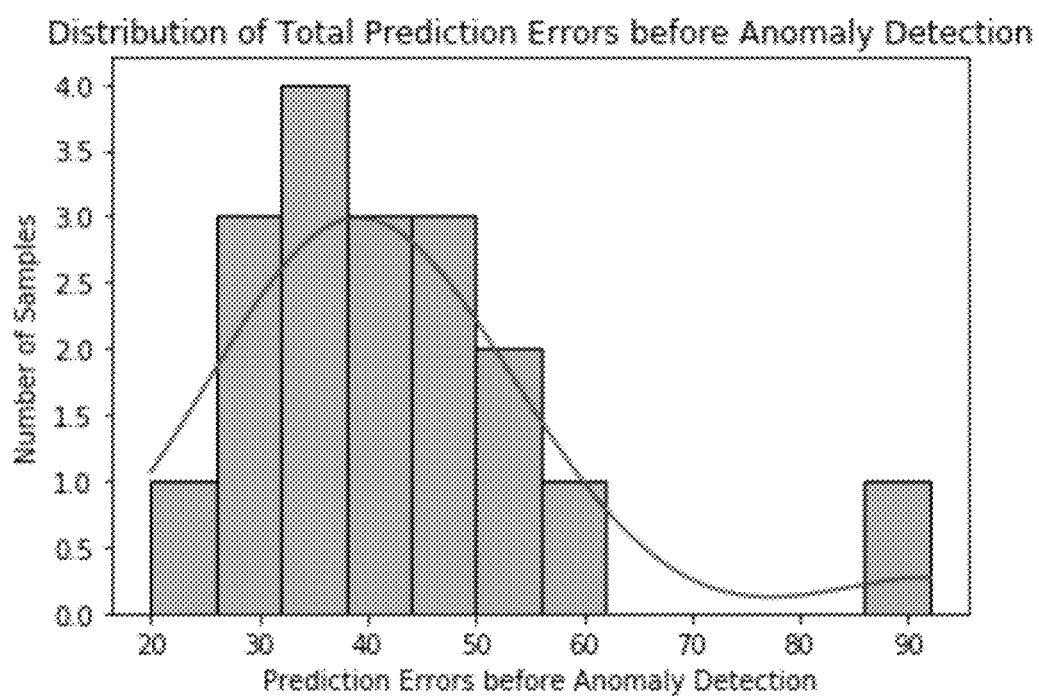
FIG. 10 shows a distribution of total prediction errors before anomaly detection.

Another important metric was latency of prediction. For every prediction there were 100 data points of sensor data and packets, and there was a potential anomaly flagged every 20 predictions. Latency was defined as: latency= $(W \cdot e_i - e_a)/s$, where W was the window (number of samples per prediction), $e_i - e_a$ were the number of predictions between the first error and the error where the anomaly threshold was crossed, and s was the sampling rate in samples per millisecond. FIG. 10 shows the delay in prediction, which were used to estimate the latency. For example, the median number of predictions between the first incorrect prediction and the anomaly (threshold crossed) was 39.5. This meant that about 3950 sensor and payload data were used in total before the error was confirmed. At a rate of 10 samples per milliseconds, 395 milliseconds of sensor data passed until detection. When taking account of all timing information, the combined setup was fast enough to classify and compare windows of data from two data streams.

Example 2—Portable Edge General Use Device

In another example, a general purpose computing device, in the form of a handheld tablet that is wirelessly connected to a network, for example, the Internet is utilized. Devices such as handheld tablets generally comprise many different types of sensors. One type of sensor that is commonly contained within a handheld tablet is a gyroscope that senses orientation. Yet another type of sensor is embedded within the touchscreen that produces pressure readings when the touchscreen is interacted with by the user. Such sensors are known to be useful for a variety of uses, one of which is demographic classification of the user. For example, using machine learning algorithms, a tablet user's interactions with the touchscreen and resulting pressure sensor output can be used to predict certain demographic characteristics of the user.

Additionally, monitoring and analyzing Internet packets received by, and sent from, the tablet device can additionally yield certain information about the user, including, by way of example, web sites being interacted with, and the like. A machine learning algorithm can classify or predict certain characteristics of the user based on characteristics of the Internet packets being received by and transmitted from the handheld tablet device when it is being manipulated by a user. Furthermore, if a malicious process is running on the handheld device, analysis of such web packets can enable a machine learning algorithm to classify if the tablet has malicious software, e.g., "malware," installed or not.

In this example, the subject matter disclosed herein, as described above, can utilize the two machine learning algorithms; the first algorithm processing sensor data and the second algorithm processing Internet packet characteristics to enhance the overall predictability and reliability of the prediction or classification task. The prediction or classification task, in this example, could be to enhance the prediction or classification of certain user demographics, identify if the user is utilizing a tablet while it is infected with malware, or identify if the user is installing and executing malware.

While preferred embodiments of the present subject matter have been shown and described herein, it will be obvious to those skilled in the art that such embodiments are provided by way of example only. Numerous variations, changes, and substitutions will now occur to those skilled in the art without departing from the present subject matter. It should be understood that various alternatives to the embodiments of the present subject matter described herein may be employed in practicing the present subject matter.

What is claimed is:

1. A computer-implemented method for control system anomaly detection comprising:
 a) receiving input data comprising: sensor data from equipment in the control system; and network data from a network in communication with the control system;
 b) normalizing distributions of the sensor data and the network data;
 c) checking time alignment between the sensor data to the network data;
 d) selecting a time window for accumulating the sensor data and the network data;
 e) feeding the sensor data into a first neural network comprising a behavior classifier of the equipment of the control system to output a first classified state of the control system;
 f) feeding the network data into a second neural network comprising a network traffic classifier to output a second classified state of the control system; and
 g) comparing the first and the second classified states for consensus for system anomaly detection, wherein accumulation of differences in classified states in a given time interval above a threshold indicates occurrence of an anomaly.

2. The method of claim 1, wherein the control system comprises an industrial control system, distributed control system (DCS), supervisory control and data acquisition (SCADA) system, embedded control system, or a combination thereof.

3. The method of claim 1, wherein the control system comprises a general purpose computer.

4. The method of claim 1, wherein the control system employs one or more standard network communication protocols selected from the group consisting of: process field bus (Profibus), process field net (Profinet), highway addressable remote transducer (HART), distributed network protocol (DNP3), Modbus, open platform communication (OPC), building automation and control networks (BACnet), common industrial protocol (CIP), and ethernet for control automation technology (EtherCAT).

5. The method of claim 1, wherein the wherein the control system employs one or more non-standard network communication protocols, or a combination of standard network communication protocols and non-standard network communication protocols.

6. The method of claim 1, wherein the sensor data comprises time series data.

7. The method of claim 1, wherein the sensor data is obtained from a standalone sensor or an integrated sensor.

8. The method of claim 7, wherein the integrated sensor is part of a control device comprising an actuator.

9. The method of claim 1, wherein the network data comprises packet data, metadata, or a combination thereof.

10. The method of claim 9, wherein the packet data comprises a packet's header, payload, trailer, or any combination thereof.

11. The method of claim 10, wherein the packet data from the packet's payload comprises bit streams.

12. The method of claim 1, wherein normalizing distributions of the sensor data and the network data comprises adjusting the distributions' mean, variance, higher-ordered moments, or a combination thereof.

13. The method of claim 1, wherein the method comprises resampling the sensor data, the network data, or a combination thereof for the time alignment between the sensor data and network data.

14. The method of claim 13, wherein the resampling results in the sensor data and the network data having a same number of samples and comprises downsampling, upsampling, or unsampling.

15. The method of claim 1, wherein the method comprises windowing to adjust the time window for accumulating the sensor data, the network data, or a combination thereof.

16. The method of claim 15, wherein the windowing accounts for delays in the network data, the sensor data, or a combination thereof.

17. The method of claim 1, wherein one or both of the first neural network and the second neural network are deep neural networks.

18. The method of claim 17, wherein the deep neural networks comprise convolutional layers such that one or both of the first neural network and the second neural network are convolutional neural networks.

19. The method of claim 18, wherein the convolutional neural networks comprise convolutional layers, pooling layers, flattening layers, dropout layers, and dense layers.

20. The method of claim 19, wherein the convolutional layers are 1D, 2D, or 3D convolutional layers.

21. The method of claim 19, wherein the pooling layers comprise maximum pooling layers, minimum pooling layers, average pooling layers, or a combination thereof.

22. The method of claim 18, wherein the convolutional neural networks have hyperparameters that are empirically chosen based on patterns in the network of the control system.

23. The method of claim 18, wherein the convolutional neural networks are supervised for training to identify one or both of the first classified state and the second classified state.

24. The method of claim 1, wherein the comparing the first and the second classified states for consensus for system anomaly detection is unsupervised for detecting the differences between the first and the second classified states.

25. The method of claim 1, wherein the threshold is an average discrepancy rate between the first and the second classified state.

26. The method of claim 25, wherein the threshold is dynamically changed over time.

27. The method of claim 1, wherein the anomaly is due to attacks on at least one of the equipment in the control system and the network of the control system.

28. A computer-implemented system for control system anomaly detection comprising:
   a) at least one logic element configured to perform operations on sensor data from equipment in the control system and network data from a network in the control system the operations comprising:
      i) a normalization operation to normalize distributions of the sensor data and the network data;
      ii) a checking operation to check time alignment between the sensor data and the network data; and
      iii) a selection operation to select a time window for accumulating the sensor data and the network data;
   b) a first neural network comprising a behavior classifier of the equipment of the control system for outputting a first classified state of the control system from the sensor data;
   c) a second neural network comprising a network traffic classifier for outputting a second classified state of the control system from the network data; and
   d) a discrepancy aggregator for comparing the first and the second classified state for consensus for control system anomaly detection, wherein accumulation of differences in the classified states in a given time interval above a threshold indicates occurrence of an anomaly.

29. A platform for control system anomaly detection comprising:
   a) an apparatus comprising: at least one logic element for performing operations on sensor data from equipment in the control system and network data from a network in communication with the control system, and a discrepancy aggregator for control system anomaly detection; and
   b) a cloud computing resource communicably coupled to the apparatus and comprising a first neural network and a second neural network;
   wherein the operations comprise:
   a) a normalization operation to normalize distributions of the sensor data and the network data;
   b) a checking operation to check time alignment between the sensor data and the network data; and
   c) a selection operation to select a time window for accumulating the sensor data and the network data;
   wherein the first neural network comprises a behavior classifier of the equipment of the control system outputting a first classified state of the control system from the sensor data from the operations;
   wherein the second neural network comprises a network traffic classifier outputting a second classified state of the control system from the network data from the operations;
   wherein the discrepancy aggregator compares the first and the second classified state for consensus for control system anomaly detection; and wherein accumulation of differences in the classified states in a given time interval above a threshold indicates occurrence of an anomaly.

30. A computer-implemented method of training neural networks for control system anomaly detection comprising:
   a) collecting input data comprising sensor data from equipment in the control system and network data from a network in communication with the control system;
   b) preprocessing the sensor data and the network data to output preprocessed sensor data and preprocessed network data, the preprocessing comprising:
      i) normalizing to adjust distributions of the sensor data and the network data;
      ii) checking the sensor data and the network data for time alignment; and
      iii) selecting a time window for accumulating the sensor data and the network data;
   c) creating training sets comprising a first training set comprising the preprocessed sensor data and a second training set comprising the preprocessed network data; and
   d) training a first neural network comprising a behavior classifier of the equipment of the control system with the first training set to output a first classified state; and e) training a second neural network comprising a network traffic classifier with the second training set to output a second classified state.

\* \* \* \* \*